(12) United States Patent
Shinohara et al.

(10) Patent No.: US 7,021,724 B2
(45) Date of Patent: Apr. 4, 2006

(54) VACUUM BOOSTER

(75) Inventors: Takayoshi Shinohara, Nagano (JP);
Toshiyuki Suwa, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 10/878,977

(22) Filed: Jun. 28, 2004

(65) Prior Publication Data

US 2005/0023890 A1    Feb. 3, 2005

(30) Foreign Application Priority Data

| Jul. 1, 2003 | (JP) | ............................. 2003-189711 |
| Jun. 8, 2004 | (JP) | ............................. 2004-169972 |
| Jun. 8, 2004 | (JP) | ............................. 2004-169973 |

(51) Int. Cl.
*B60T 13/52* (2006.01)

(52) U.S. Cl. ................................. 303/114.3; 91/376 R

(58) Field of Classification Search ............. 303/114.3; 91/369.3, 376 R
See application file for complete search history.

(56) References Cited

U.S. PATENT DOCUMENTS

| 6,516,704 B1 | 2/2003 | Inoue et al. |
| 6,564,692 B1* | 5/2003 | Inoue et al. ................ 91/369.3 |
| 2002/0057013 A1* | 5/2002 | Kuno et al. .............. 303/114.3 |
| 2002/0073834 A1* | 6/2002 | Shinohara ................. 91/376 R |
| 2003/0052533 A1* | 3/2003 | Miwa et al. ............. 303/114.3 |
| 2003/0056643 A1* | 3/2003 | Takasaki et al. .......... 91/376 R |

FOREIGN PATENT DOCUMENTS

| JP | 09123900 | 5/1997 |
| JP | 10059164 | 3/1998 |
| JP | 2001-063551 | 3/2001 |
| JP | 2001-341632 | 12/2001 |

* cited by examiner

*Primary Examiner*—Chris Schwartz
(74) *Attorney, Agent, or Firm*—Carrier, Blackman & Associates, P.C.; Joseph P. Carrier; William D. Blackman

(57) ABSTRACT

In a vacuum booster in which a reaction force mechanism is interposed between an input rod and a valve cylinder connected integrally with a booster piston, and an output rod, a valve piston is fitted onto an input piston connecting the input rod and the reaction force mechanism to be slidably movable forward from a predetermined retreat position with respect to the input piston, the valve piston is biased to the retreat position by a set spring, and locking device is provided between the valve piston and the valve cylinder to lock the valve piston at the valve cylinder thereby holding an atmosphere introduction valve seat in an open state at the time of emergency braking when the input piston moves forward by a predetermined number of strokes ahead of the valve cylinder. Thus, while a delay in atmosphere introduction into the operating chamber is eliminated irrespective of normal braking or emergency braking, the output is allowed to reach a servo limit point earlier and held at the time of emergency braking.

7 Claims, 13 Drawing Sheets

FIG.2 (BRAKING HALT)

FIG.4 (NORMAL BRAKING)

FIG.5 (EMERGENCY BRAKING)

FIG.6 (EMERGENCY BRAKING RELEASED)

FIG.9 (BRAKING HALT)

FIG.11 (NORMAL BRAKING)

(EMERGENCY BRAKING)

(EMERGENCY BRAKING RELEASED)

VACUUM BOOSTER

BACKGROUND OF THE INVENTION

1. Field of the Invention

The present invention relates to a vacuum booster used for the servo operation of a brake master cylinder for an automobile. The present invention particularly relates to an improvement in a vacuum booster comprising: a booster shell; a booster piston accommodated in the booster shell to divide an interior of the booster shell into a front vacuum chamber connected to a vacuum source and a rear operating chamber; a valve cylinder slidably supported at a rear wall of the booster shell to be connected to the booster piston; an input rod movable forward and backward, an input return spring that biases the input rod in a retreat direction, and a control valve that changes over communication of the operating chamber with one of the vacuum chamber and atmosphere in accordance with forward and backward movement of the input, which are rod are placed in the valve cylinder; the control valve being constituted by an atmosphere introduction valve seat that is formed on a valve piston which moves linking to the forward and backward movement of the input rod, a vacuum introduction valve seat that is connected to the valve cylinder to move linking to forward and backward movement of the valve cylinder, and a valve element that is biased by a spring in a direction in which it is seated on the atmosphere introduction valve seat and the vacuum introduction valve seat, cuts off communication of the operating chamber with the atmosphere and vacuum chamber when the valve element sits on both the valve seats, allows the operating chamber to communicate with the atmosphere when the atmosphere introduction valve seat opens following the forward movement of the input rod, and allows the operating chamber to communicate with the vacuum chamber when the vacuum introduction valve seat opens following the retreat of the input rod; and a reaction force mechanism that is interposed between the valve cylinder with the input rod and the output rod that is slidably supported at the booster shell, and that transmits a combined force of a manipulation input to the input rod and a propulsive force of the booster piston by atmospheric pressure difference between the operating chamber and the vacuum chamber to an output rod, wherein a valve piston is fitted onto an input piston of the reaction force mechanism which is connected to the input rod, so that the valve piston is capable of sliding forward from a predetermined retreat position with respect to the input piston, wherein a set spring that biases the valve piston to the retreat position is provided between the input piston and the valve piston, and wherein locking means is provided between the valve piston and the valve cylinder to hold the atmosphere introduction valve seat in an open state by locking the valve piston, which moves forward with the input piston, at the valve cylinder at the time of emergency braking when the input piston moves forward by a predetermined number of strokes or more ahead of the valve cylinder.

2. Description of the Related Art

Japanese Patent Application Laid-open Nos. 2001-63551 and 2001-341632 disclose conventional vacuum booster boosters, wherein at the time of emergency braking, the atmosphere introduction valves are opened large to introduce a large quantity of atmosphere into the operating chambers quickly so as to allow the output rods to exhibit a high output force.

In the vacuum booster disclosed in Japanese Patent Application Laid-open No. 2001-63551, a valve piston is fitted onto an input piston, which connects an input rod and a reaction force mechanism, so that the valve piston is slidable between a retreat position and an advance position along an axial direction with respect to the input piston; and a control valve is constituted by an atmosphere introduction valve seat that is formed at the rear end of the valve piston, a vacuum introduction valve seat that is formed in a valve cylinder to enclose the atmosphere introduction valve seat, a cylindrical valve element that has a common valve portion disposed to be opposite to and capable of being seated on the atmosphere introduction valve seat and the vacuum introduction valve seat at a front end and is mounted to the inner peripheral surface of the valve cylinder, and a valve spring that biases the valve portion in the direction in which the valve portion is seated on the atmosphere introduction valve seat and the vacuum introduction valve seat. Also, the valve cylinder is provided with a first port that communicates with the vacuum chamber and opens to an outer periphery of the vacuum introduction valve seat and a second port that communicates with the operating chamber and opens between the atmosphere introduction valve seat and the vacuum introduction valve seat, the inside of the valve element is allowed to communicate with the atmosphere, the valve piston is biased to the retreat position with a smaller set load of the return spring than the valve spring, and delay means for delaying the retreat of the valve piston by the biasing force of the return spring from the advance position is provided between the valve piston and the input piston. According to this constitution, at the time of emergency braking when the input rod is rapidly advanced, the valve piston receives the delay effect of the delay means and advances with the input piston while substantially keeping the advance position, and therefore the atmosphere introduction valve seat of the valve piston is separated greatly from the valve portion of the valve element simultaneously with the advance of the input rod and is opened to the maximum, whereby a large quantity of atmosphere is introduced into the operating chamber, and a large advancing propulsive force caused by the large atmospheric pressure difference between the vacuum chamber and the operating chamber is given to the booster piston immediately to raise a large output force of the output rod quickly, thus responding to the emergency braking. In addition, expensive solenoid device and emergency braking sensor are not required, and therefore the effect of contributing to reduction in cost is provided.

However, in this vacuum booster, the valve piston closes the atmosphere introduction valve seat in the state in which the valve piston is located at a predetermined advance position with respect to the input piston at a halt time, and therefore when the input piston advances, the atmosphere introduction valve seat cannot be opened unless the valve piston moves to the retreat position with respect to the input piston. Accordingly, the advancing strokes of the input piston until the valve piston is moved to the retreat position from the advance position become invalid strokes, and the atmosphere introduction into the operating chamber is delayed more or less. The vacuum booster disclosed in Japanese Patent Application Laid-open No. 2001-341632 has the same disadvantages.

SUMMARY OF THE INVENTION

The present invention has been achieved in view of the above circumstances, and has an object to provide a vacuum booster which is capable of allowing an output to reach a servo limit point earlier to be held thereat at the time of emergency braking while eliminating a delay in atmosphere introduction into an operating chamber irrespective of normal braking or emergency braking.

In order to achieve the object, according to a first aspect of the present invention, there is provided a vacuum booster comprising: a booster shell; a booster piston accommodated in the booster shell to divide an interior of the booster shell into a front vacuum chamber connected to a vacuum source and a rear operating chamber; a valve cylinder slidably supported at a rear wall of the booster shell to be connected to the booster piston; an input rod movable forward and backward, an input return spring that biases the input rod in a retreat direction, and a control valve that changes over communication of the operating chamber with one of the vacuum chamber and atmosphere in accordance with forward and backward movement of the input rod, which are placed in the valve cylinder; the control valve being constituted by an atmosphere introduction valve seat that is formed on a valve piston which moves in a manner operatively connected with the forward and backward movement of the input rod, a vacuum introduction valve seat that is connected to the valve cylinder to move in a manner operatively connected with forward and backward movement of the valve cylinder, and a valve element that is biased by a spring in a direction in which it is seated on the atmosphere introduction valve seat and the vacuum introduction valve seat, cuts off communication of the operating chamber with the atmosphere and vacuum chamber when the valve element sits on both the valve seats, allows the operating chamber to communicate with the atmosphere when the atmosphere introduction valve seat opens following the forward movement of the input rod, and allows the operating chamber to communicate with the vacuum chamber when the vacuum introduction valve seat opens following the retreat of the input rod; and a reaction force mechanism that is interposed between the valve cylinder with the input rod and an output rod that is slidably supported at the booster shell, and that transmits a combined force of a manipulation input to the input rod and a propulsive force of the booster piston by atmospheric pressure difference between the operating chamber and the vacuum chamber to the output rod, wherein a valve piston is fitted onto an input piston of the reaction force mechanism which is connected to the input rod, so that the valve piston is capable of sliding forward from a predetermined retreat position with respect to the input piston, wherein a set spring that biases the valve piston to the retreat position is provided between the input piston and the valve piston, and wherein locking means is provided between the valve piston and the valve cylinder to hold the atmosphere introduction valve seat in an open state by locking the valve piston, which moves forward with the input piston, at the valve cylinder at the time of emergency braking when the input piston moves forward by a predetermined stroke or more ahead of the valve cylinder.

According to the first aspect of the invention, at the time of emergency braking when the input rod is rapidly moved forward, the input piston moves forward by the predetermined number of strokes or more ahead of the valve cylinder, and thereby the locking means locks the valve piston at the valve cylinder to hold the atmosphere introduction valve seat in the open state. Accordingly, even if the valve cylinder thereafter moves forward to follow the forward movement of the input rod, the valve piston moves forward integrally with the valve cylinder, and therefore the fully open state of the atmosphere introduction valve seat is kept. As a result, a large quantity of atmosphere is introduced into the operating chamber at a time, the output of the booster piston can immediately reach the servo limit point at which the atmospheric difference between the vacuum chamber and the operating chamber becomes the maximum, thereby promptly responding to the emergency braking. In addition, there is no need to use expensive solenoid device or an emergency braking sensor, the vacuum booster can be provided at a low cost.

At the time of normal braking, or at the time of emergency braking, the valve piston having the atmosphere introduction valve seat can move forward at the same time as the initial movement of the input rod, and therefore there is no delay in opening of the atmosphere introduction valve seat, thus enhancing operational responsiveness of the booster piston.

According to a second aspect of the present invention, there is provided a vacuum booster comprising: a booster shell; a booster piston accommodated in the booster shell to divide an interior of the booster shell into a front vacuum chamber connected to a vacuum source and a rear operating chamber; a valve cylinder slidably supported at a rear wall of the booster shell to be connected to the booster piston; an input rod movable forward and backward, an input return spring that biases the input rod in a retreat direction, and a control valve that changes over communication of the operating chamber with one of the vacuum chamber and atmosphere in accordance with forward and backward movement of the input rod, which are placed in the valve cylinder; the control valve being constituted by an atmosphere introduction valve seat that is formed on a valve piston which moves in a manner operatively connected with the forward and backward movement of the input rod, a vacuum introduction valve seat that is connected to the valve cylinder to move in a manner operatively connected with forward and backward movement of the valve cylinder, and a valve element that is biased by a spring in a direction in which it is seated on the atmosphere introduction valve seat and the vacuum introduction valve seat, cuts off communication of the operating chamber with the atmosphere and vacuum chamber when the valve element sits on both the valve seats, allows the operating chamber to communicate with the atmosphere when the atmosphere introduction valve seat opens following the forward movement of the input rod, and allows the operating chamber to communicate with the vacuum chamber when the vacuum introduction valve seat opens following the retreat of the input rod; and a reaction force mechanism that is interposed between the valve cylinder with the input rod and an output rod that is slidably supported at the booster shell, and that transmits a combined force of a manipulation input to the input rod and a propulsive force of the booster piston by atmospheric pressure difference between the operating chamber and the vacuum chamber to the output rod; and the reaction force mechanism being constituted by an input piston connected to the input rod, an operating piston that connects to the booster piston and is placed to enclose the input piston, an output piston connected to the output rod, and an elastic reaction piston that is interposed between a rear end surface of the output piston and front end surfaces of the input piston and the operating piston, wherein a support cylinder that is molded separately from the valve cylinder is attached to the valve cylinder, wherein a valve piston is fined onto the input piston which is slidably fined to an inner periphery of the support cylinder, so that the valve piston is capable of sliding forward from a predetermined retreat position with respect to the input piston, wherein a set spring that biases the valve piston to the retreat position is provided between the input piston and the valve piston, and wherein locking means is provided between the support cylinder and the valve piston to hold the atmosphere introduction valve seat in an open state by locking the valve piston, which moves forward with the input piston, at the support cylinder at the time of emergency braking when the input piston moves forward by a predetermined stroke or more ahead of the valve cylinder.

According to the second aspect of the invention, in addition to the effects of the first aspect of the invention, the input piston moves forward by the predetermined number of strokes or more ahead of the valve cylinder, and thereby the locking means locks the valve piston at the support cylinder attached to the valve cylinder to hold the atmosphere introduction valve seat in the open state. Accordingly, even if the valve cylinder thereafter moves forward to follow the forward movement of the input rod, the valve piston moves forward integrally with the support cylinder, and therefore the fully open state of the atmosphere introduction valve seat is kept. As a result, a large quantity of atmosphere is introduced into the operating chamber at a time, the output of the booster piston can immediately reach the servo limit point at which the atmospheric difference between the vacuum chamber and the operating chamber becomes the maximum, thereby promptly responding to the emergency braking. In addition, there is no need to use an expensive solenoid device or an emergency braking sensor, and therefore the vacuum booster can be provided at a low cost.

At the time of normal braking, or at the time of emergency braking, the valve piston having the atmosphere introduction valve seat can move forward at the same time as the initial movement of the input rod, and therefore there is no delay in opening of the atmosphere introduction valve seat, thus enhancing operational responsiveness of the booster piston.

The support cylinder at which the valve piston is locked is molded separately from the valve cylinder, and therefore even if the support cylinder is formed into a special shape such as the shape including an annular locking protuberance for locking the valve piston, the support cylinder can be easily molded without any interference of the valve cylinder. The valve cylinder is simplified in its internal shape because the support cylinder is separated, and the molding of the valve cylinder is facilitated, thus generally reducing the size of the valve cylinder in the axial direction to make the vacuum booster compact ultimately.

In addition to the second aspect, according to a third aspect of the present invention, the valve cylinder includes a through-hole that penetrates through a center portion of the valve cylinder and a recessed portion that opens to a front surface of the valve cylinder and connects to the through-hole via a step portion; the support cylinder is placed in the through-hole, and a mounting flange formed at a front end of the support cylinder is fitted into the recessed portion; the operating piston of the reaction force mechanism is constituted by a front end portion of the support cylinder having the mounting flange and an annular portion formed at the valve cylinder to enclose the recessed portion; and a fitting portion of the annular portion and the support cylinder is sealed by the elastic reaction piston that is in close contact with the front end surface of the operating piston.

According to the third aspect of the invention, the support cylinder is placed to penetrate through the through-hole in the center portion of the valve cylinder, the mounting flange at the front end portion of the support cylinder is fitted into the recessed portion in the front end surface of the valve cylinder, the operating piston of the reaction force mechanism is constituted by the front end portion of the support cylinder and the annular portion formed at the valve cylinder to enclose the recessed portion, and the fitting portion of the annular portion and the support cylinder is sealed by the elastic reaction piston in close contact with the front end surface of the operating piston. Therefore, the support cylinder can be easily connected to the valve cylinder without using a special fixing member which connect the support cylinder to the valve cylinder, and in addition the elastic reaction piston also serves as the seal member for sealing a space between the annular portion and the support cylinder, whereby a special seal member is not required and the structure can be simplified.

In addition to any one of the first to third aspects, according to a fourth aspect of the present invention, the locking means is constituted by a locking protuberance that is formed on an outer periphery of the support cylinder connected to the valve cylinder, and elastic locking claws which are formed on the valve piston and elastically engage with the locking protuberance at the time of emergency braking.

According to the fourth aspect of the invention, the locking means can be constituted in a simple structure.

In addition to any one of the first to third aspects, according to a fifth aspect of the present invention, the locking means is constituted by a locking protuberance that is formed on an outer periphery of the support cylinder connected to the valve cylinder, and a locking spring attached to the support cylinder; the locking spring has an elastic engaging portion that contracts in a radial direction of the support cylinder; the elastic engaging portion is located behind the locking protuberance to face an inside of the valve piston through a slit formed at a side wall of the support cylinder so as not to contact an outer peripheral surface of the support cylinder; and at the time of the emergency braking, the elastic engaging portion rides over the locking protuberance and engages with a front surface of the locking protuberance.

According to the fifth aspect of the invention, the locking means can be constituted in a simple structure, and the elastic engaging portion of the locking spring is normally held in the non-contacting state in which the elastic engaging portion do not apply the pressure to the outer peripheral surface of the support cylinder by means of the slit at the side wall of the valve piston. Therefore, as long as the elastic engaging portion does not ride on the locking protuberance on the outer peripheral surface of the support cylinder, the elastic engaging portion does not strongly contact the outer peripheral surface of the support cylinder by friction, and thus sliding resistance is not caused. Accordingly, the manipulation feeling at the time of normal braking when relative displacement of the valve cylinder and the support cylinder is extremely small can be made favorable.

In addition to the fifth aspect, according to a sixth aspect of the invention, the locking spring has a pair of leg portions having an elastic force to contract to contact each other, both the leg portions being located behind the locking protuberance to face an inside of the valve piston through slits that are formed at opposite side portions of the support cylinder so as not to contact an outer peripheral surface of the support cylinder; and at the time of the emergency braking, both the leg portions ride over the locking protuberance and engage with a front surface of the locking protuberance.

According to the sixth aspect of the invention, both the leg portions can be constituted easily by the rod material of the locking spring, and at the time of emergency braking, both the leg portions of the locking spring are engaged with the locking protuberance, thus obtaining stable locking state.

In addition to the first or second aspect, according to a seventh aspect of the present invention, the locking means is constituted so that engagement between the valve piston and the support cylinder by the locking means is released by a retreat force by an input return spring of the input rod.

According to the seventh aspect of the invention, if the input rod is released after the emergency braking, the input rod retreats by the biasing force of the input return spring, whereby the operation of the locking means is released, and the valve piston can be returned to the predetermined retreat position on the valve piston by the biasing force of the set spring.

The above-described object and the other objects, the characteristics and the advantages of the present invention will become apparent from the explanation of preferred embodiments that will be described in detail below along the accompanying drawings.

DESCRIPTION OF THE PREFERRED EMBODIMENTS

Hereinafter, preferred embodiments of the present invention will be explained based on the attached drawings.

Figure 1:
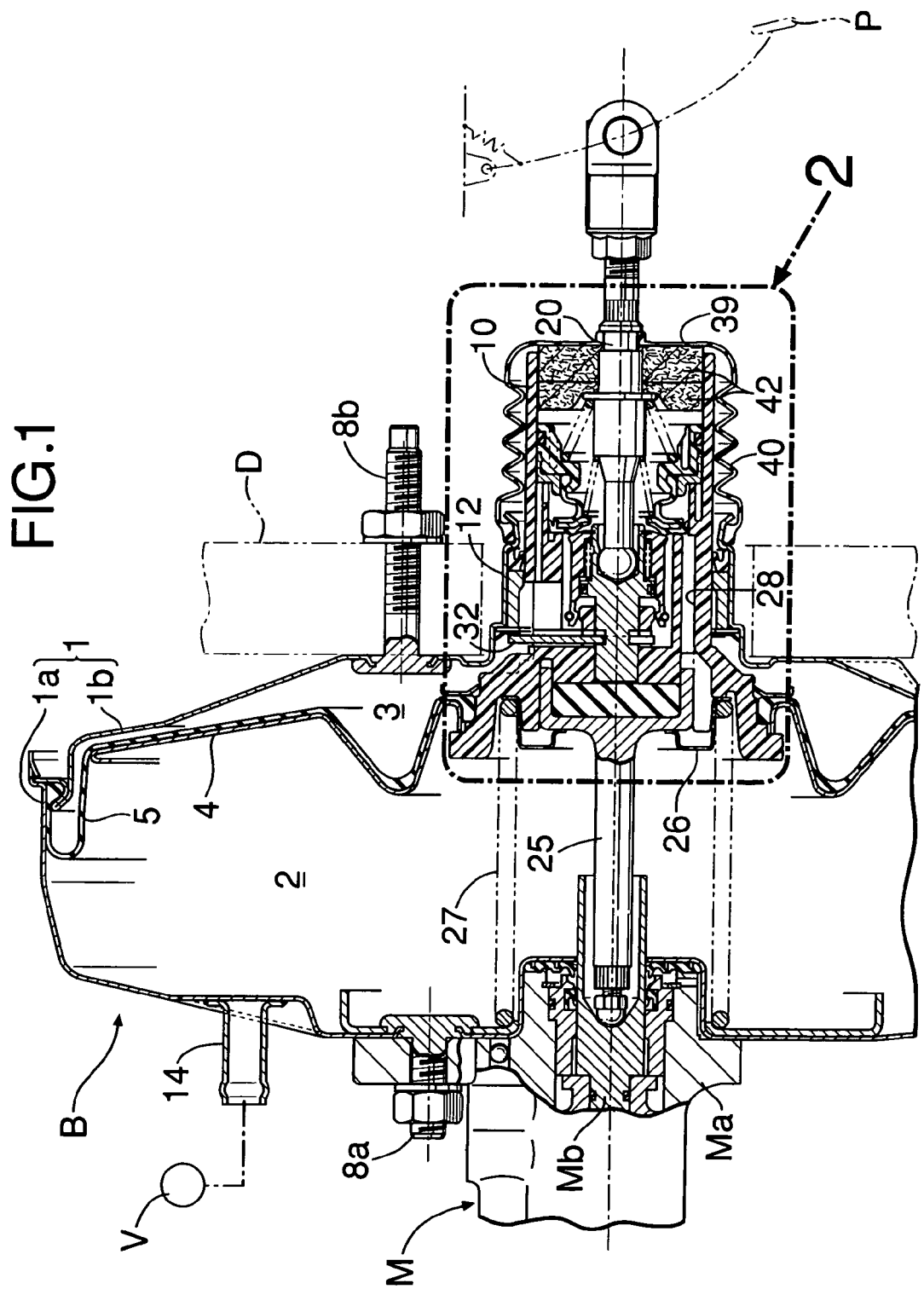
FIG. 1 is a longitudinal sectional view of a vacuum booster according to a first embodiment of the present invention.
Figure 2:
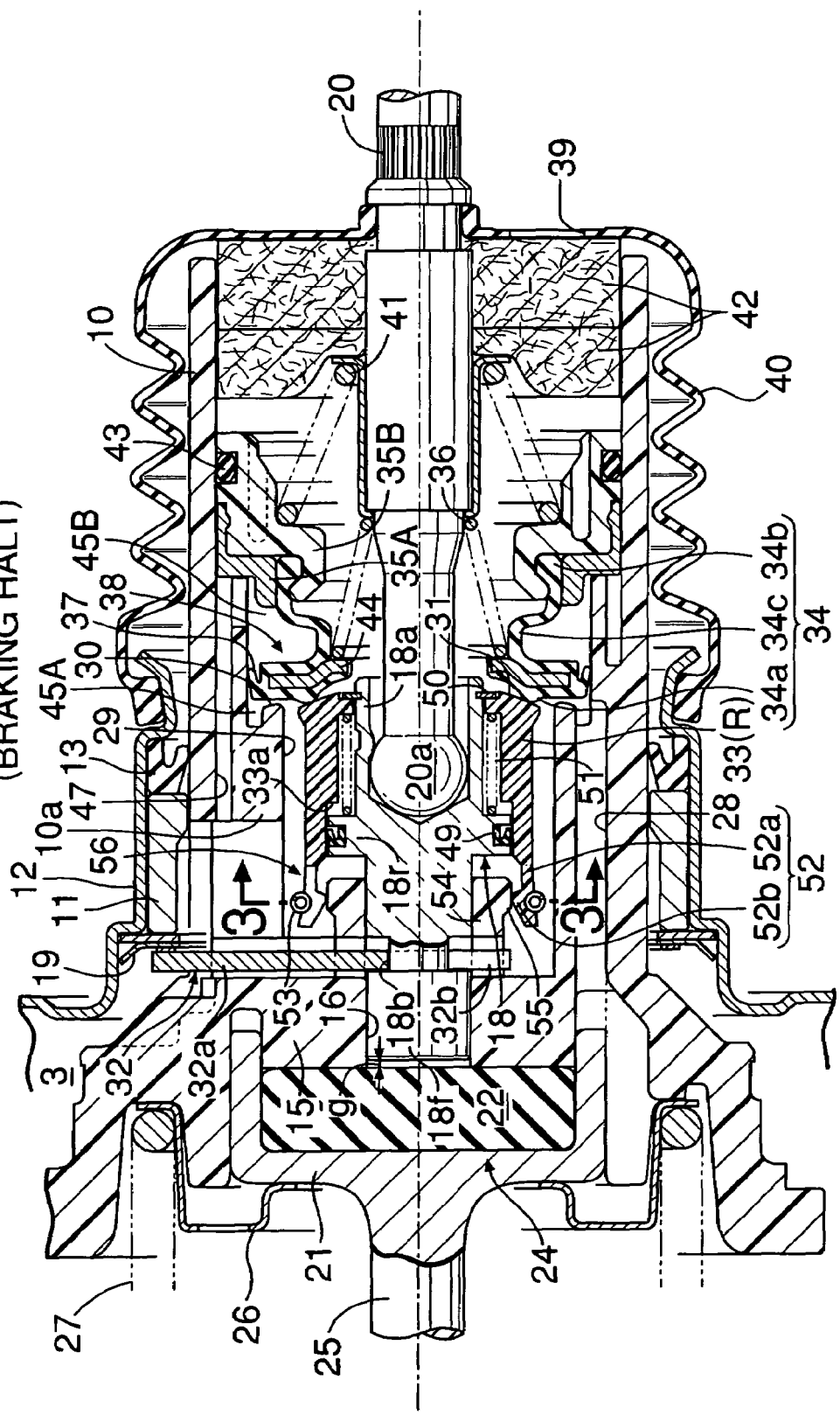
FIG. 2 is an enlarged sectional view (halted state) of part 2 in FIG. 1.
Figure 3:
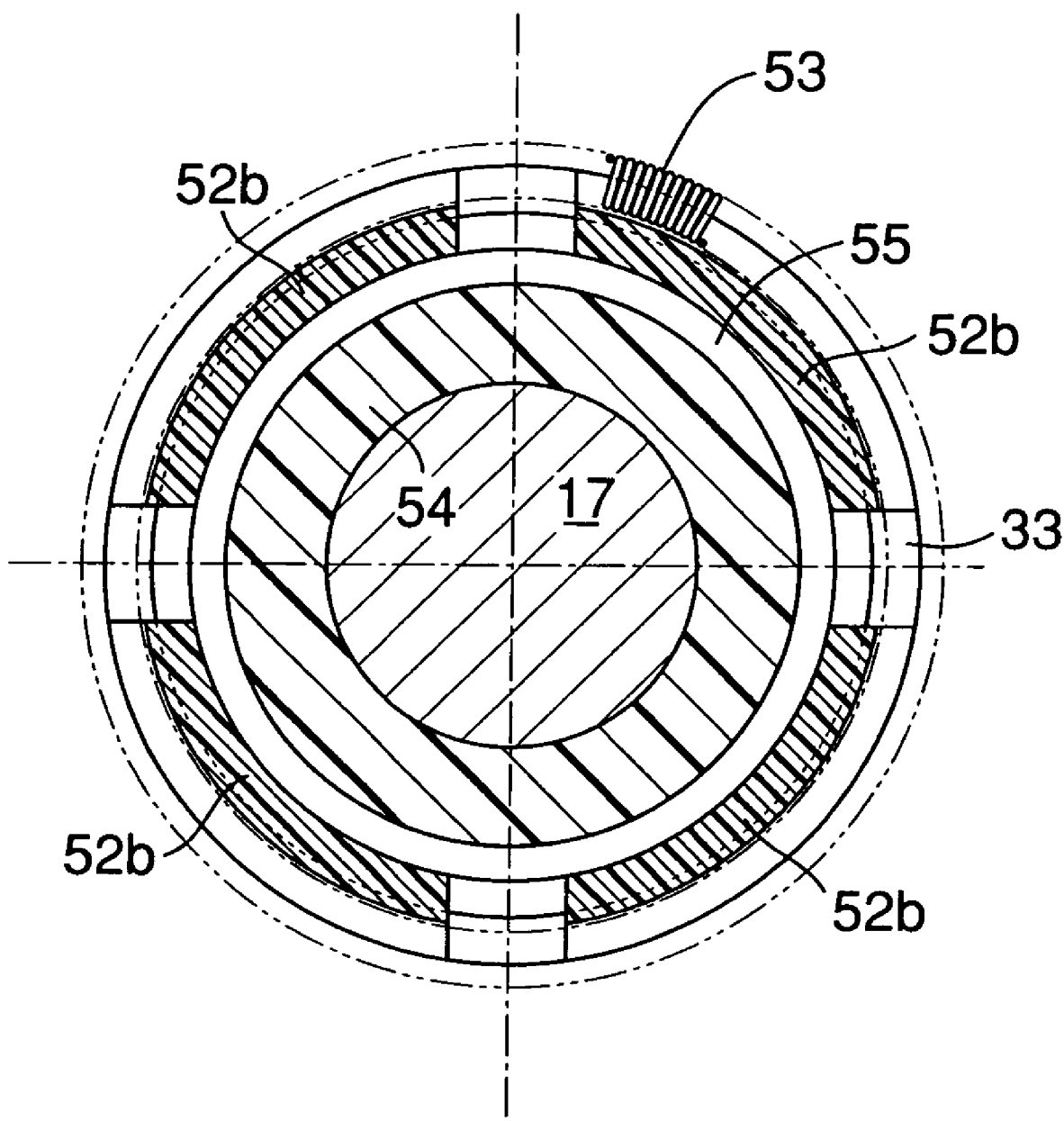
FIG. 3 is a sectional view taken along the line 3—3 in FIG. 2.

First, a first embodiment of the present invention will be explained. In FIGS. 1 and 2, a booster shell 1 of a vacuum booster B is constituted of a pair of a front half shell 1a and a rear half shell 1b, the facing ends of which are connected with each other. The rear half shell 1b is secured to and supported at a front wall D of an automobile compartment with a bolt 8b, and a cylinder body Ma of a brake master cylinder M operated by the booster B is secured to the front half shell body 1a with a bolt 8a.

An inside of the booster shell 1 is divided into a front vacuum chamber 2 and a rear operating chamber 3, by a booster piston 4 which is reciprocally accommodated in the booster shell 1, and a diaphragm 5 which is bonded over the rear face of the booster piston 4 and sandwiched between both the half shell bodies 1a and 1b. The vacuum chamber 2 is connected to a vacuum source V (for example, the interior of the intake manifold of an internal combustion engine) via a vacuum introduction pipe 14.

The booster piston 4 is formed into a ring shape of a steel plate, and a valve cylinder 10 made of a synthetic resin is integrally coupled with center portions of the booster piston 4 and the diaphragm 5. The valve cylinder 10 is slidably supported, via a bearing member 11 and a seal member 13, at a support cylinder 12 projecting rearward from the center of the rear half shell 1b.

An input piston 18, an input rod 20 connected to the input piston 18, and a control valve 38 that changes over communication of the operating chamber 3 with one of the vacuum chamber 2 and the atmosphere in accordance with the forward and backward movement of the input rod 20, are placed in the valve cylinder 10.

The input piston 18 is constituted by an input piston rear portion 18r, a connection cylinder portion 18a connected to a rear end of the input piston rear portion 18r, and an input piston front portion 18f that is smaller in diameter than the input piston rear portion 18r and connected to a front end of the input piston rear portion 18r. A small-diameter neck portion 18b is formed in an intermediate portion of the input piston front portion 18f, and a seal member 49 is attached to an outer periphery of the input piston rear portion 18r. A spherical front end portion 20a of the input rod 20 is fitted into an inside of the connection cylinder portion 18a, and part of the connection cylinder portion 18a is crimped to prevent it from slipping off the spherical front end 20a. As a result, the input rod 20 is pivotally connected to the input piston 18. A brake pedal P for operating the input rod 20 forward is connected to the rear end of the input rod 20.

Figure 6:
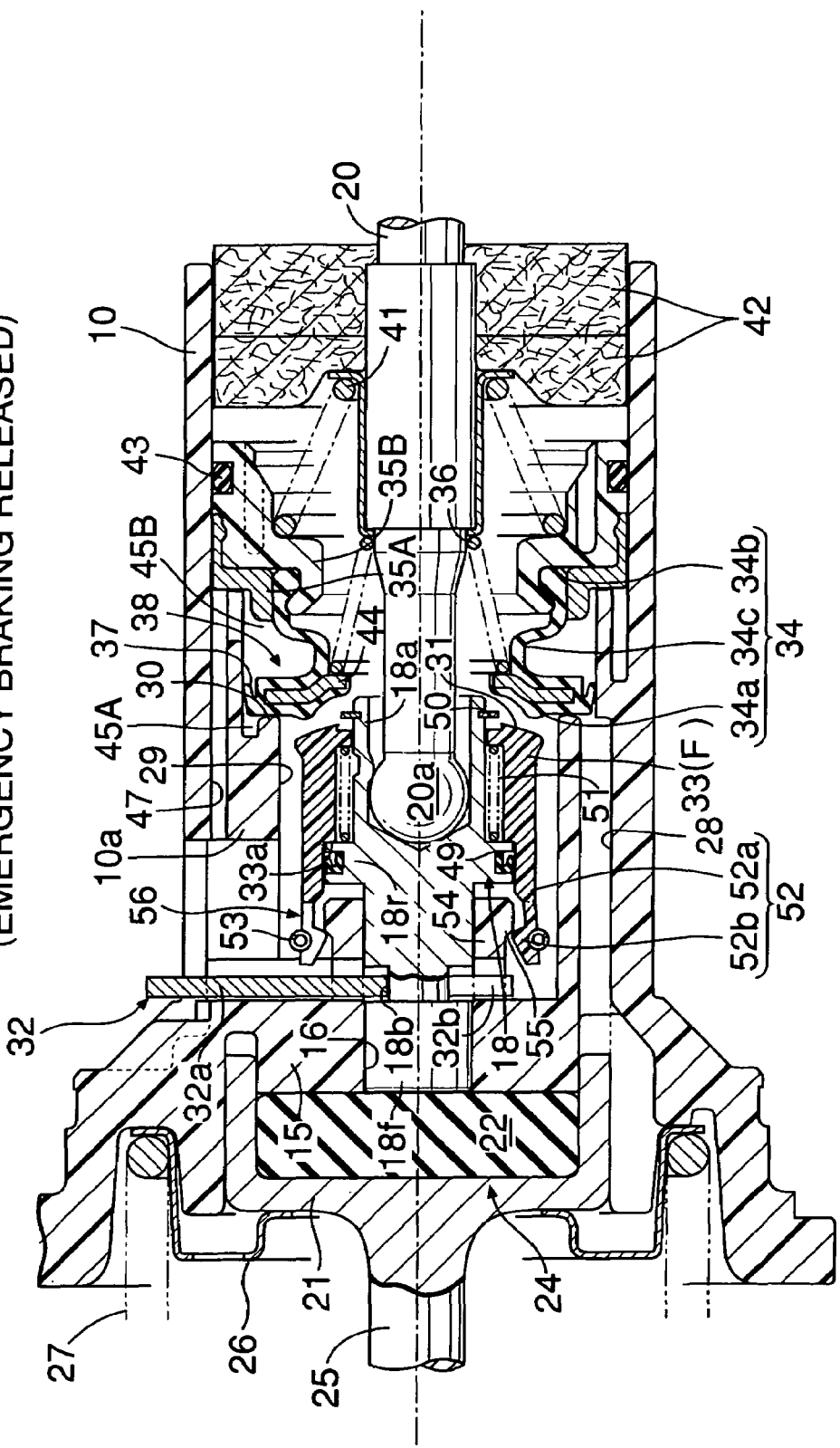
FIG. 6 is an explanatory view of an operation at a time of release from the emergency braking state.

A cylindrical valve piston 33 in close contact with the seal member 49 is fitted onto an outer peripheral surface of the input piston rear portion 18r to be able to slide between a retreat position R (see FIG. 2) and an advance position F (see FIG. 6). The retreat position R is defined by a rear end surface of the valve piston 33 being received by a stop ring 50 locked at an outer periphery of a rear end portion of the connection cylinder portion 18a. The advance position F of the valve piston 33 is defined by an annular shoulder portion 33a formed at an inner periphery of the valve piston 33 abutting on a rear end surface of the input piston 18. A set spring 51 that biases the valve piston 33 toward the retreat position R is disposed under compression between the input piston 18 and the valve piston 33.

An atmosphere introduction valve seat 31 is formed at a rear end of the valve piston 33. A plurality of locking claws 52, 52 . . . arranged in a circumferential direction are integrally formed at a front end of the valve piston 33. Each of the locking claws 52, 52 . . . is formed of an elastic arm portion 52a extending forward from the front end of the valve piston 33 and bendable in a radial direction, and a claw portion 52b formed at a tip end portion of the elastic arm portion 52a and facing inward in the radial direction. Annular springs 53 which always bias these locking claws 52, 52 . . . inward in the radial direction are fitted into outer peripheries of the locking claws 52, 52 . . . .

A support cylinder 54 projecting toward the front end surface of the valve piston 33 is integrally formed at the inner end surface of the valve cylinder 10, and the support cylinder 54 has an annular locking protuberance 55 of which outer peripheral surface is made cylindrical at an outer periphery of the rear end portion.

Thus, when the valve piston 33 is located at the retreat position R, the claw portions 52b of the locking claws 52, 52 . . . are slidable in contact with the outer peripheral surface of the locking protuberance 55, but at the time of emergency braking when the input piston 18 moves forward in advance by a predetermined number of strokes or more with respect to the valve cylinder 10, the claw portions 52b of the valve piston 33 that advance with the input piston 18 engage with the front end surface of the locking protuberance 55, whereby the valve piston 33 can be locked at the support cylinder 54 against the set load of the set spring 51 in the full open state of the atmosphere introduction seat 31. Accordingly, at the time of emergency braking, the locking claws 52, 52 . . . , the locking protuberance 55 and the annular spring 53 constitute locking means 56 which keeps the full open state of the atmosphere introduction valve seat 31 by engaging the valve piston 33, which advances with the input piston 18, at the valve cylinder 10.

When the locking claws 52, 52 . . . are locked at the front end surface of the locking protuberance 55, the locking surfaces at which they engage with each other are respectively formed into the forward-tapered surfaces inclining in a radially inward direction. Even in the state in which the locking claws 52, 52 . . . are locked at the locking protuberance 55, when a retreating force of a predetermined value or more that is larger than the set load of the set spring 51 works on the valve piston 33, the locking surfaces slide and the claw portions 52b are returned to the outer peripheral surface of the locking protuberance.

An annular vacuum introduction valve seat 30 that is placed concentrically with the atmosphere introduction valve seat 31 to enclose the atmosphere introduction valve seat 31 of the valve piston 33 is formed in the valve cylinder 10.

One common valve element 34 that cooperates with the atmosphere introduction valve seat 31 and the vacuum introduction valve seat 30 is attached in the valve cylinder 10. The valve element 34 is entirely formed of an elastic material such as rubber, and formed by a ring-shaped attachment bead portion 34b, the extending and contracting cylinder portion 34c that extends forward from the attachment bead portion 34b, and a flange-shaped valve portion 34a that extends outward in the radial direction from a front end of the extending and contracting cylinder portion 34c. A ring-shaped reinforcing plate 44 is inserted into the valve portion 34a from an inner peripheral side to be molding-coupled thereto. A ring-shaped sealing lip 37 that bends to the rear is integrally formed with the outer periphery of the valve portion 34a.

The attachment bead portion 34b is hermetically sandwiched between a pair of valve holders 35A and 35B that abut to the rear end of a ring-shaped projection 10a integrally formed in the inner peripheral side of the valve cylinder 10 together with the vacuum introduction valve seat 30. A sealing member 43 such as an O-ring that is in close contact with the inner peripheral surface of the valve cylinder 10 is attached to the rear valve holder 35B.

The valve portion 34a is disposed facing the atmosphere introduction valve seat 31 and the vacuum introduction valve seat 30 so that the valve portion 34a can sit on the atmosphere introduction valve seat 31 and the vacuum introduction valve seat 30. A valve spring 36 that biases the valve portion 34a in the direction in which the valve portion 34a sits on both the valve seats 30 and 31 is provided under compression between the reinforcing plate 44 of the valve portion 34a and the input rod 20. As a result, a control valve 38 is constituted by the vacuum introduction valve seat 30, the atmosphere introduction valve seat 31, the valve element 34 and the valve spring 36.

An input return spring 41 is provided under compression between the rear valve holder 35B and the input rod 20, and thereby the front and rear valve holders 35A and 35B are contacted and held with a rear end of the ring-shaped projection 10a of the valve cylinder 10, while the input rod 20 is biased in the retreating direction.

A front annular chamber 45A that encloses the vacuum introduction valve seat 30 is formed in the ring-shaped projection 10a on the inner periphery of the valve cylinder 10, and the front face of the valve portion 34a faces the chamber 45A. The inner peripheral surface of the radially outer wall of the front annular chamber 45A extends rearward beyond the vacuum introduction valve seat 30, and the sealing lip 37 on the outer periphery of the valve portion 34a closely contacts the inner peripheral surface of the annular chamber 45A to be slidable along the annular chamber 45A. Accordingly, the front annular chamber 45A is closed when the valve portion 34a is seated on the vacuum introduction valve seat 30.

Furthermore, a rear annular chamber 45B which the rear face of the valve portion 34a faces, is defined inside the ring-shaped projection 10a by using the valve portion 34a with the sealing lip 37.

First and second ports 28 and 29 are provided in the valve cylinder 10. One end of the first port 28 opens into the vacuum chamber 2, and the other end thereof opens into the front annular chamber 45A. One end of the second port 29 opens into the operating chamber 3, and the other end thereof opens between the vacuum introduction valve seat 30 and the atmosphere introduction valve seat 31. The second port 29 also communicates with the rear annular chamber 45B via a communication hole 47 which is formed at the base of the ring-shaped projection 10a and is parallel to the axial line of the valve cylinder 10.

The opposite ends of a boot 40, which covers the valve cylinder 10 and can be stretched and contracted, are fitted around the input rod 20 and the rear end of the support cylinder portion 12 of the rear half shell 1b. An atmosphere inlet port 39 communicating with the inside of the valve element 34 is provided in the rear end portion of the boot 40. A filter 42, which filters the air that flows through the atmosphere inlet port 39, is provided between the outer peripheral surface of the input rod 20 and the inner peripheral surface of the valve cylinder 10. The filter 42 has a flexibility so as not to interfere with the relative movements of the input rod 20 and the valve cylinder 10.

A key 32 which defines the retreat limits of the booster piston 4 and the valve piston 18 is attached to the support cylinder 54 so that the key 32 can be moved within a predetermined distance in the axial direction. The key 32 has a fork portion 32b, which extends across the neck portion 18b of the input piston 18, at an inner end of the key 32, and an outer end of the key 32a is disposed to face the front face of a stopper wall 19 provided at the support cylinder portion 12 of the rear half shell 1b. Therefore, when the key 32 abuts to the stopper wall 19, the retreat limits of the booster piston 4 and the valve cylinder 10 are determined, and when the front end surface of the neck portion 18b of the input piston 18 abuts to the key 32, the retreat limits of the input piston 18 and the input rod 20 are determined. Since the length of the neck portion 18b in the axial direction is set to be larger than the thickness of the key 32, the input piston 18 and the key 32 can be slightly moved relatively to each other.

An operating piston 15 projecting forward and a small-diameter cylinder hole 16 penetrating through the center of the operating piston 15 are provided in the valve cylinder 10, and the input piston front portion 18f is slidably fitted into the small-diameter cylinder hole 16. A cup-shaped output piston 21 is slidably fitted over an outer periphery of the operating piston 15. A flat elastic reaction piston 22 is interposed between the opposing surfaces of the output piston 21, and the operating piston 15 and the input piston front portion 18f in the axial direction. A specific gap g is formed between the input piston front portion 18f and the elastic reaction force piston 22 when the vacuum booster B is not being operated.

An output rod 25 is projectingly provided at the front face of the output piston 21, and the output rod 25 is connected to a piston Mb of the brake master cylinder M.

In the above arrangement, the operating piton 15, the input piston front portion 18f, the elastic reaction piston 22 and the output piston 21 constitute a reaction mechanism 24 that transmits a force combining the input force to the input rod 20 and the propulsive force of the booster piston 4 by the atmospheric pressure difference between the operating chamber 3 and the vacuum chamber 2, to the output rod 25.

A retainer 26 is disposed to abut on the output piston 21 and the front end surface of the valve cylinder 10. A booster return spring 27, which biases the booster piston 4 and the valve cylinder 10 in the retreating direction is provided under compression between the retainer 26 and the front wall of the booster shell 1.

Next, an operation of this embodiment will be explained.

Halt of Vacuum Booster

In the state in which the vacuum booster B is halted, as shown in FIGS. 1 and 2, the key 32 attached to the support cylinder 54 of the valve cylinder 10 abuts on the front surface of the stopper wall 19 of the rear half shell 1b, and the front end surface of the neck portion 18b of the input piston 18 abuts to the key 32, whereby the booster piston 4 and the input rod 20 are located at the respective retreat limits. At this time, the valve piston 33 is held at the retreat position R at which the valve piston 33 abuts to the stop ring 50 on the input piston 18 by the biasing force of the set spring 51, and the atmosphere introduction valve seat 31 at the rear end of the valve piston 33 is seated on the valve portion 34a of the valve element 34, and presses against the valve portion 34a to separate the valve portion 34a slightly from the vacuum introduction valve seat 30. Thus, communication between the atmosphere inlet port 39 and the second port 29 is cut off, while communication between the first and second ports 28 and 29 is established. Therefore, the vacuum pressure in the vacuum chamber 2 is transmitted via both the ports 28 and 29 to the operating chamber 3, and since this equalizes the pressures in the chambers 2 and 3, the booster piston 4 and the valve cylinder 10 are held at the retreat position by the biasing force exerted by the booster return spring 27.

Normal Braking

When the brake pedal P is depressed at a normal speed to brake a vehicle, and the input rod 20 and the input piston 18 are driven forward, the input piston 18 is driven forward with the valve piston 33 held at the retreat position R from the beginning. Therefore, the extending and contracting cylinder portion 34c is expanded by the biasing force of the valve spring 36 immediately, and the valve portion 34a is seated on the vacuum introduction valve seat 30, while at the same time, the atmosphere introduction valve seat 31 is separated from the valve element 34, whereby the communication between the first and second ports 28 and 29 is cut off, and the communication of the second port 29 with the atmosphere introduction port 39 via the inside of the valve element 34 is established.

As a result, the atmosphere fed into the valve cylinder 10 from the atmosphere introduction port 39 passes through the atmosphere introduction valve seat 31, is introduced into the operating chamber 3 via the second port 29 to make the pressure of the operating chamber 3 higher than the vacuum chamber 2. Therefore, the booster piston 4, which obtains the forward propulsive force based on the atmospheric pressure difference, is moved forward against the force of the booster return spring 27, together with the valve cylinder 10, the operating piston 15, the elastic reaction piston 22, the output piston 21 and the output rod 25, and presses the piston Mb of the brake master cylinder M forward by the output rod 25, so that the thus-generated hydraulic pressure operates the corresponding wheel brakes. In this manner, the atmosphere introduction valve seat 31 moves forward at the same time when the input rod 20 moves forward, and separates from the valve portion 34a, thereby enhancing the responsiveness of the booster piston 4.

Figure 7:
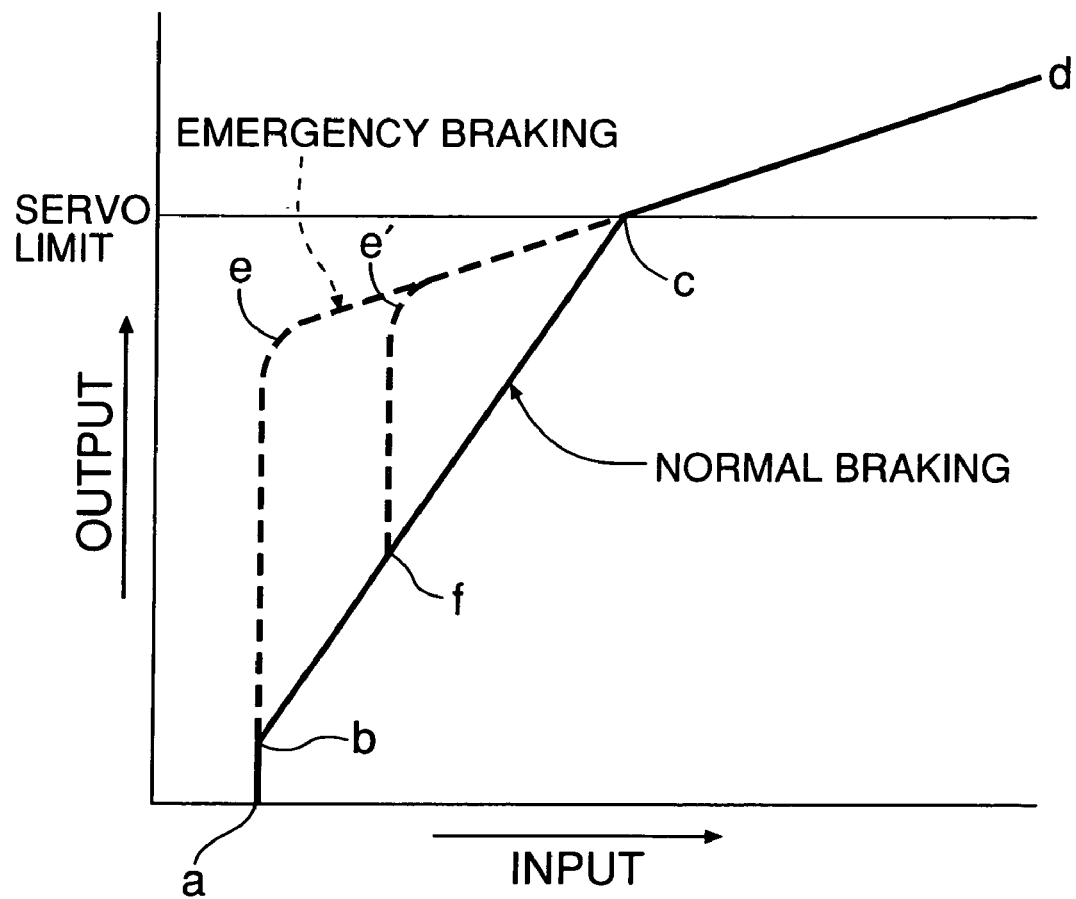
FIG. 7 is a diagram showing an output property of the vacuum booster.

Since the reaction force is not transmitted to the input rod 20 from the reaction force mechanism 24 at the early stage of forward movement of the input rod 20, until the input piston front portion 18f reduces the gap g and abuts to the elastic reaction piston 22, even if the atmosphere introduction valve seat 31 opens, the output of the output rod 25 has a jumping characteristic which produces a sudden rise, as indicated by the line a-b in FIG. 7.

During the forward movement operation of the input rod 20, the vacuum pressure, which is transmitted from the first port 28 to the front annular chamber 45A, acts on the front surface of the valve portion 34a that faces the front annular chamber 45A of the valve cylinder 10, while the atmospheric pressure, which is transmitted from the second port 29 via the communication hole 47 to the rear annular chamber 45B, acts on the rear surface of the valve portion 34a that faces the rear annular chamber 45B of the valve cylinder 10. Therefore, the valve portion 34a is biased in the direction in which it is seated on the vacuum introduction valve seat 30, not only by the set load of the valve spring 36, but also by the difference in pressures between the front and rear annular chambers 45A and 45B. Therefore, the set load of the valve spring 36 can be reduced by a value equivalent to the biasing force produced by the atmospheric pressure difference, and accordingly, the set load of the input return spring 41, which biases the input rod 20 in the retreat direction, can also be reduced. As a result, the jumping characteristic can be obtained by applying a comparatively small initial manipulation input force, so that invalid strokes of the brake master cylinder M and the wheel brakes can be quickly removed, to enhance the responsiveness of each of the wheel brakes.

Further, in this state, since the sealing lip 37 on the outer periphery of the valve portion 34a is bent to the rear and closely contacts the inner peripheral surface of the valve cylinder 10, the contact force applied to the inner peripheral surface can be increased by the atmospheric pressure difference between the front and rear annular chambers 45A and 45B, and airtightness between both the annular chambers 45A and 45B can be secured.

After the input piston front portion 18f abuts to the elastic reaction piston 22, a part of the reaction force exerted by the output rod 25 is fed back to the input rod 20 via the elastic reaction piston 22, and therefore the operator can perceive the magnitude of the output of the output rod 25.

Figure 4:
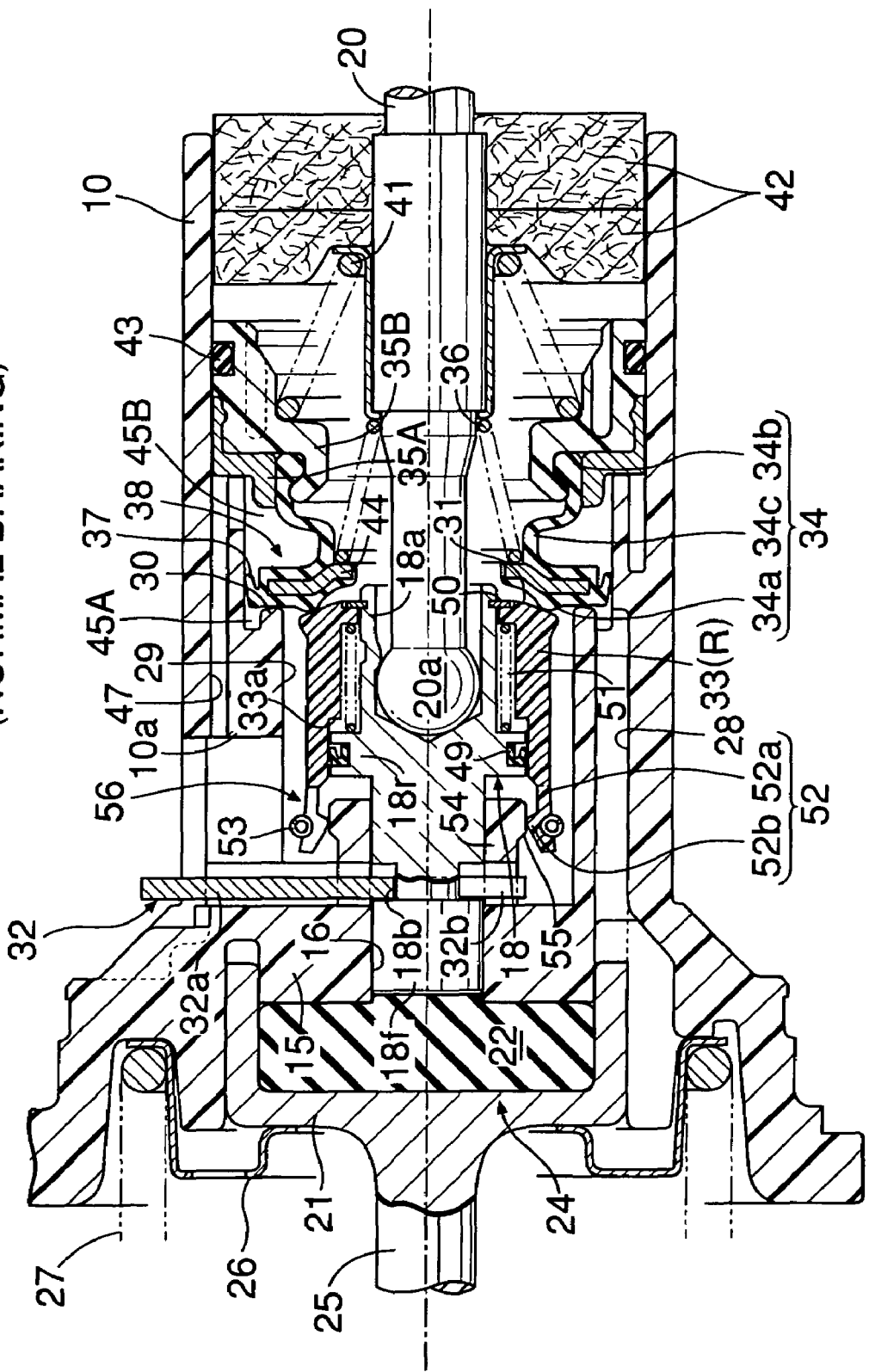
FIG. 4 is an explanatory view of an operation of the vacuum booster at a time of normal braking.

If the forward movement of the input rod 20 is stopped after the desired output is obtained, the forward movement of the booster piston 4 stops by seating the valve portion 34a of the valve element 34 on the atmosphere introduction valve seat 31 again to stop any further introduction of the atmosphere into the vacuum chamber 2 (see FIG. 4). Accordingly, the valve cylinder 10 and the booster piston 4 move forward following the forward movement of the input rod 20.

At the time of normal braking wherein the forward moving speed of the input rod 20 is comparatively low, a delay in following of the booster piston 4 and the valve cylinder 10 to the input rod 20 is comparatively small. Therefore, the relative displacement of the input rod 20 and the valve cylinder 10 is small, and thus the locking claws 52, 52 . . . of the valve piston 33 which moves forward with the input piston 18 connected to the input rod 20 only slide the claw portions 52b on the outer peripheral surface of the locking protuberance 55 of the valve cylinder 10 with a small number of strokes.

The output force of the output rod 25 increases as indicated by the line b-c in FIG. 7, at a servo ratio which is determined by the ratio of the pressure reception areas of the operating piston 15 and the input piston front portion 18f that contact the elastic reaction piston 22.

After the pressure difference between the vacuum chamber 2 and the operating chamber 3 reaches the servo limit point c, the output of the output rod 25 is equal to the sum of the maximum propulsive force produced by the atmospheric pressure difference in the booster piston 4 and the operating input force to the input rod 20, as indicated by the line c-d.

Emergency Braking

Figure 5:
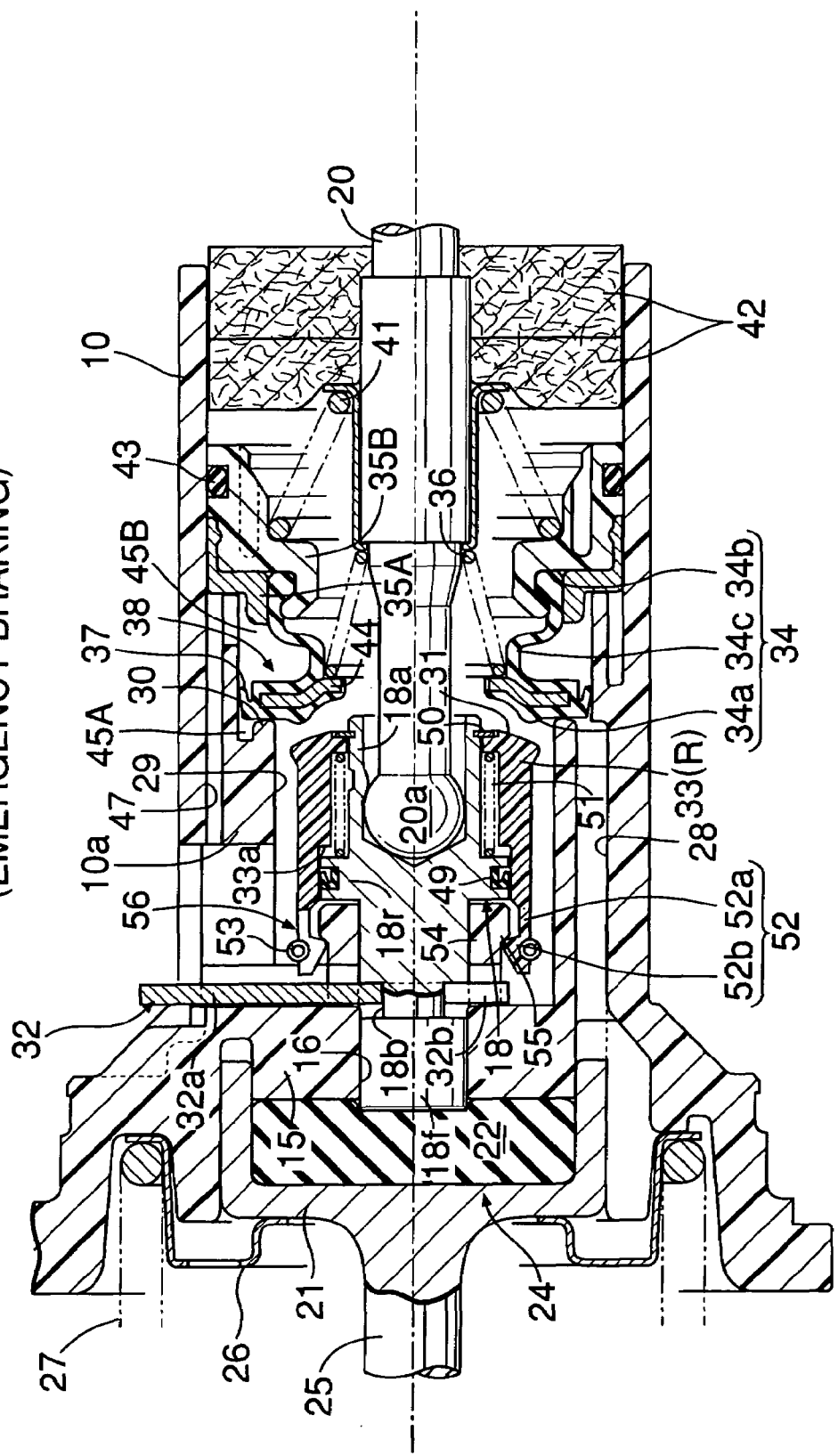
FIG. 5 is an explanatory view of an operation of the vacuum booster at a time of emergency braking.

At the time of emergency braking when the brake pedal P is rapidly depressed, the forward moving speed of the input piston 18 is high, and therefore, before the booster piston 4 and the valve cylinder 10 start to move forward, the input piston 18 and the valve piston 33 are greatly moved forward while the elastic reaction piston 22 is being compressed by the input piston front portion 18f. Then, as shown in FIG. 5, the claw portions 52b of the locking claws 52, 52 . . . of the valve piston 33 are released forward from the outer peripheral surface of the locking protuberance 55 of the valve cylinder 10, and bent inward in the radial direction by the contracting force of the annular spring 53 to engage with the front end surface of the locking protuberance 55, so that the locking claws 52, 52 . . . are in the state in which they engage with the valve cylinder 10 against the biasing force of the set spring 51, to hold the atmosphere introduction seat 31 in the fully opened state in which the atmosphere introduction valve seat 31 is separated to the maximum from the valve portion 34a of the valve element 34.

Thus, when the valve piston 33 is locked at the valve cylinder 10 in the fully opened state of the atmosphere introduction valve seat 31, even if the booster piston 4 and the valve cylinder 10 slightly move forward following the forward movement of the input rod 20, the valve piston 33 moves forward with the valve cylinder 10 against the set load of the set spring 51, and therefore the fully opened state of the atmosphere introduction valve seat 31 is kept. As a result, a large quantity of atmosphere is introduced into the vacuum chamber 2 at a time, the atmospheric pressure difference between the vacuum chamber 2 and the operating chamber 3 immediately reaches the servo limit point c at which the atmospheric pressure difference is the maximum, as indicated by the line a-e-c in FIG. 7, and keeps on strongly pressing the piston Ma of the master cylinder M, thus responding to the emergency braking. When the emergency braking is performed during normal braking, the atmospheric pressure difference immediately reaches the servo limit point c as shown by the line f-e'-c in FIG. 7, thus responding to the emergency braking. In addition, there is no need to use an expensive solenoid device or an emergency braking sensor, and therefore the vacuum booster can be provided at low cost.

In the emergency braking, the atmosphere introduction valve seat 31 moves forward at the same time as the forward movement of the input rod 20, to be separated from the valve portion 34a, and therefore responsiveness of the booster piston 4 can be enhanced.

Release from Emergency Braking State

When the depressing force is released from the brake pedal P to release the emergency braking state, the input rod 20 and the input piston 18 first retreat by the force of the input return spring 41. When the input piston 18 begins to retreat, the rear end surface of the input piston 18 abuts to the annular shoulder portion 33a of the inner periphery of the valve piston 33, so that the input piston 18 returns the valve piston 33 to the rear, as shown in FIG. 6. Therefore the locking claws 52, 52 . . . are bent outward in the radial direction while releasing the claw portions 52b from the front end surface of the locking protuberance 55.

When the claw portions 52b are released from the front end surface of the locking protuberance 55, the valve piston 33 promptly returns to the retreat position R at which the valve piston 33 abuts to the stop ring 50 of the input piston 18 by the biasing force of the set spring 51, seats the atmosphere introduction valve seat 31 on the valve portion 34a of the valve element 34, and presses the valve portion 34a to the rear to be separated from the vacuum introduction valve seat 30. Therefore, the operating chamber 3 communicates with the vacuum chamber 2 via the second port 29 and the first port 28, and the introduction of the atmosphere into the operating chamber 3 is inhibited, while the air of the operating chamber 3 is taken into the vacuum source V via the vacuum chamber 2, so that the atmospheric pressure difference between them is eliminated. Therefore, the booster piston 4 also retreats by the elastic force of the booster return spring 27, and the operation of the master cylinder M is released. The booster piston 4 and the input rod 20 return to the halted state in FIG. 1 and FIG. 2 again.

Figure 8:
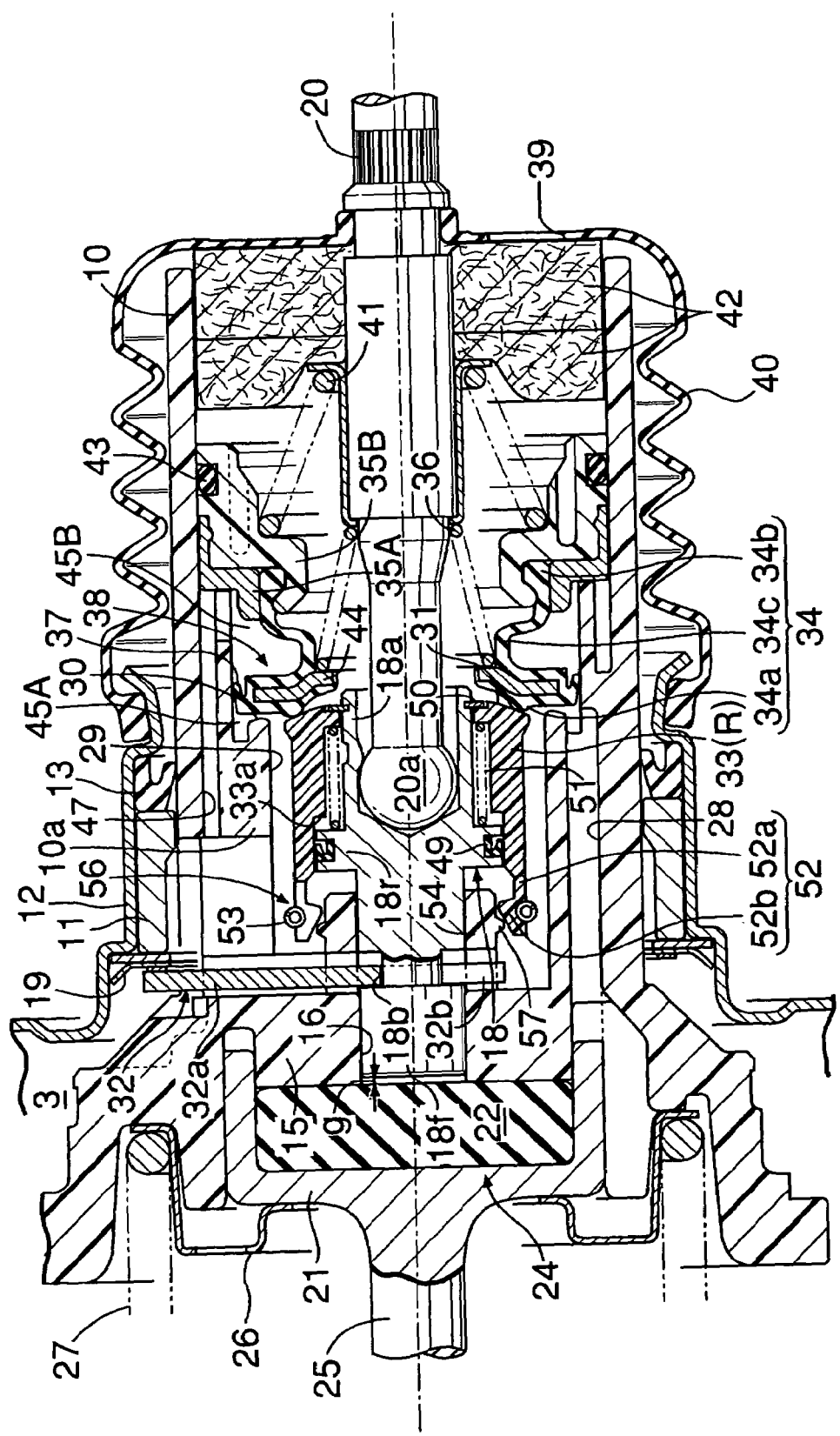
FIG. 8 is a sectional view corresponding to FIG. 2 (halted state) showing a vacuum booster according to a second embodiment of the present invention.

Next, a second embodiment of the present invention as shown in FIG. 8 will be explained.

In this second embodiment, instead of the locking protuberance 55 in the locking means 56 of the first embodiment, an annular protuberance 57 semicircular in section is formed on the outer peripheral surface of the intermediate portion of the support cylinder 54, and the claw portions 52b of the locking claws 52, 52 . . . are normally in contact with the outer periphery of the support cylinder 54 in the rear of the locking protuberance 57. At the time of emergency braking, the claw portions 52b get over the locking protuberance 57 to be locked at the front end surface of the locking protuberance 57.

Since the other parts of constitution are the same as in the previous embodiment, the corresponding parts to the first embodiment are denoted by the same reference numerals and characters, and the explanation thereof will be omitted.

Next, a third embodiment of the present invention shown in FIG. 9 to FIG. 13 will be explained.

Figure 9:
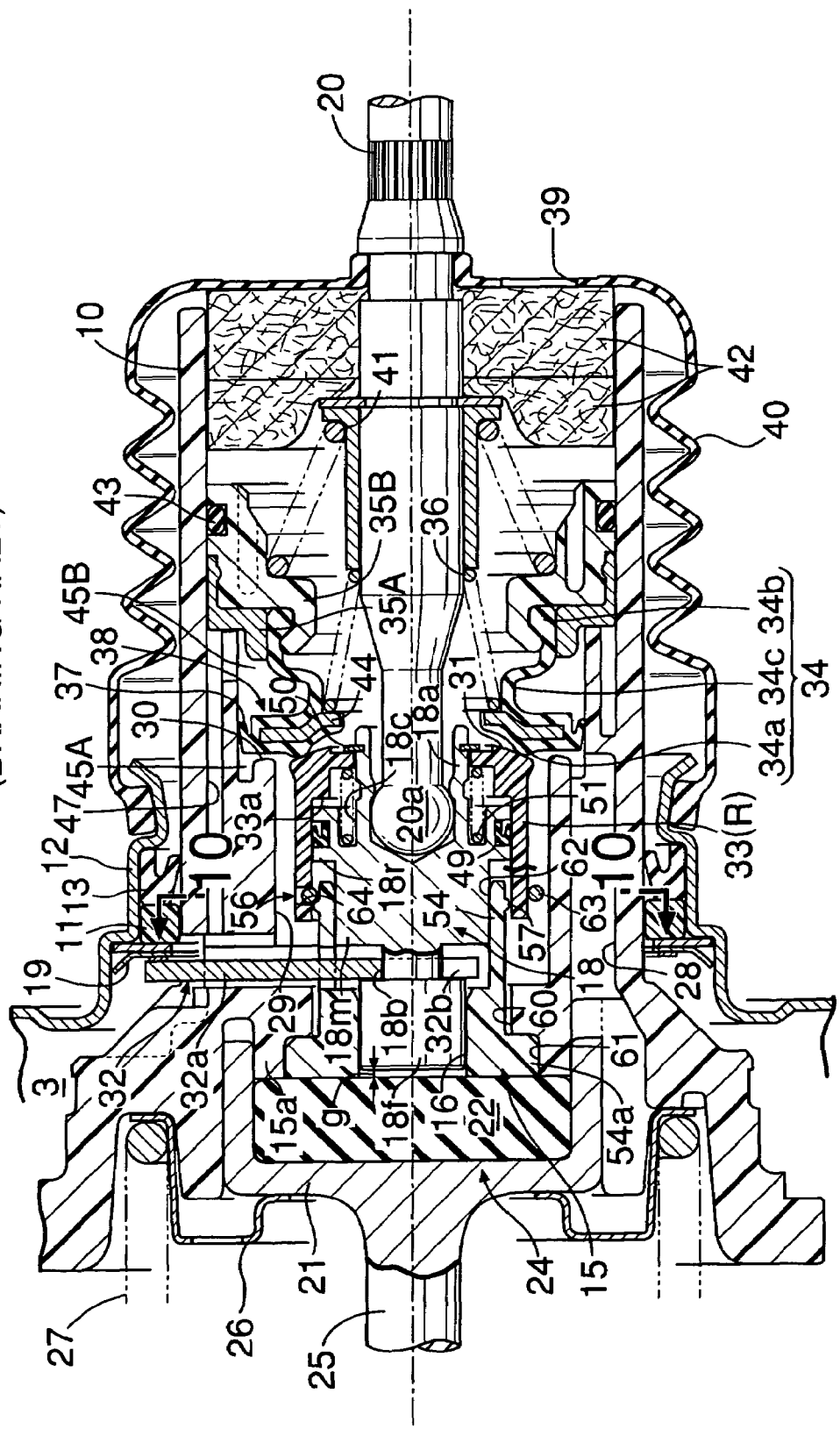
FIG. 9 is a sectional view corresponding to FIG. 2 (halted state) showing a vacuum booster according to a third embodiment of the present invention.

In FIG. 9, the support cylinder 54 made of a synthetic resin having the annular locking protuberance 57 on the outer periphery is connected to the valve cylinder 10 as follows after being molded separately from the valve cylinder 10. Namely, the support cylinder 54 has a mounting flange 54a on the outer periphery of the front end portion. A through-hole 60 which penetrates through the center portion of the valve cylinder 10 is formed in the valve cylinder 10, and a circular recessed portion 61 is formed at the front end surface of the operating piston 15 with an annular outer peripheral portion 15a being left. The support cylinder 54 is disposed in the through-hole 60 with the mounting flange 54a being fitted into the recessed portion 61. After all, the operating piston 15 of the reaction force mechanism 24 is constituted by the annular outer peripheral portion 15a and the front end portion of the support cylinder 54 having the mounting flange 54a. The elastic reaction piston 22 of the reaction force mechanism 24 is disposed to be in close contact with both the front end surfaces of the annular outer peripheral portion 15a and the support cylinder 54. Thus, the support cylinder 54 is connected to the valve cylinder 10 and a space between the annular outer peripheral portion 15a and the mounting flange 54a is sealed by the elastic reaction piston 22. The support cylinder 54 is provided with a small-diameter cylinder hole 16 opened to the front end surface of the support cylinder 54 and a large-diameter guide hole 62 connected to the rear end of the support cylinder 54.

The input piston 18 is constituted by an input piston rear portion 18r, an input piston intermediate portion 18m which is connected to the front end of the input piston rear portion 18r and has a smaller diameter than the input piston rear portion 18r, and an input piston front portion 18f which is connected to the front end of the input piston intermediate portion 18m and has a smaller diameter than the input piston intermediate portion 18m. A neck portion 18b is formed between the input piston front portion 18f and the input piston intermediate portion 18m, and an annular spring holding groove 18c which opens to the rear end surface of the input piston rear portion 18r is formed in the input piston rear portion 18r.

The input piston front portion 18f is slidably fitted into the small-diameter cylinder hole 16 of the support cylinder 54, and the input piston intermediate portion 18m is slidably fitted into the guide hole 62. The key 32 attached to the valve cylinder 10 and the support cylinder 54 is engaged with the neck portion 18b. The input rod 20 is pivotally connected to the connecting cylinder portion 18a in the same manner as in the first embodiment.

Figure 13:
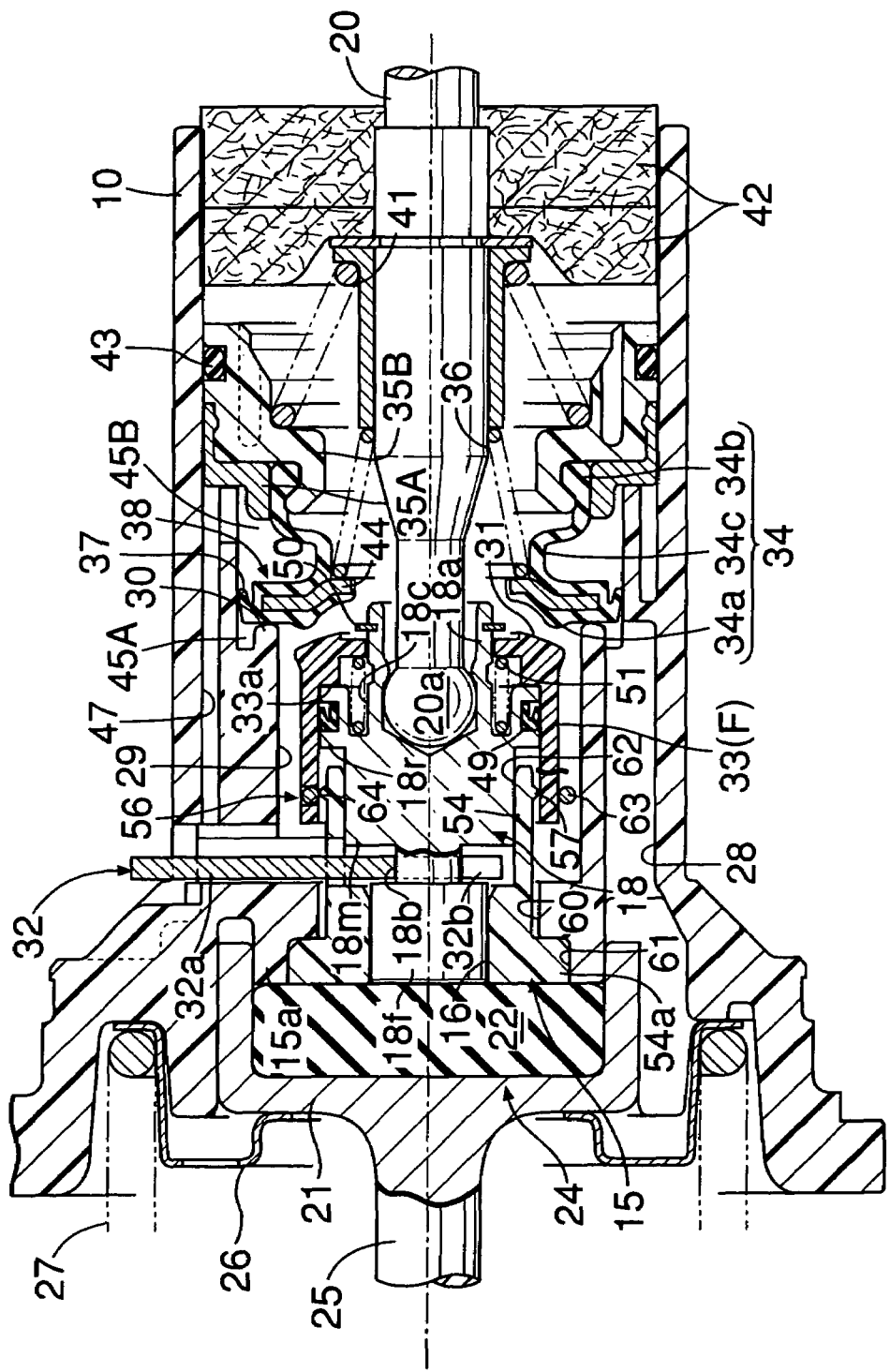
FIG. 13 is an explanatory view of an operation at the time of release from the emergency braking state.

The seal member 49 is attached to the outer peripheral surface of the input piston rear portion 18r, and the cylindrical valve piston 33 is fitted onto the outer peripheral surface to be slidable between the retreat position R (see FIG. 9) and advance position F (see FIG. 13). The retreat position R is determined when the rear end surface of the valve piston 33 is received by the stop ring 50 locked at the outer periphery of the rear end portion of the connecting cylinder portion 18a, and the advance position F of the valve piston 33 is determined when the annular shoulder portion 33a formed at the inner periphery of the rear end portion of the valve piston 33 abuts to the rear end surface of the input piston 18. A set spring 51 which biases the valve piston 33 toward the retreat position R is provided under compression between the input piston 18 and the valve piston 33, and in this situation, a front half portion of the set spring 51 is accommodated in the spring holding groove 18c.

An annular locking protuberance 57 which is fitted into the inner periphery of the front end portion of the valve piston 33 to be relatively slidable is formed on the outer peripheral surface of the rear end portion of the support cylinder 54, and a locking spring 63 which cooperates with the locking protuberance 57 is attached to the valve piston 33.

Figure 10:
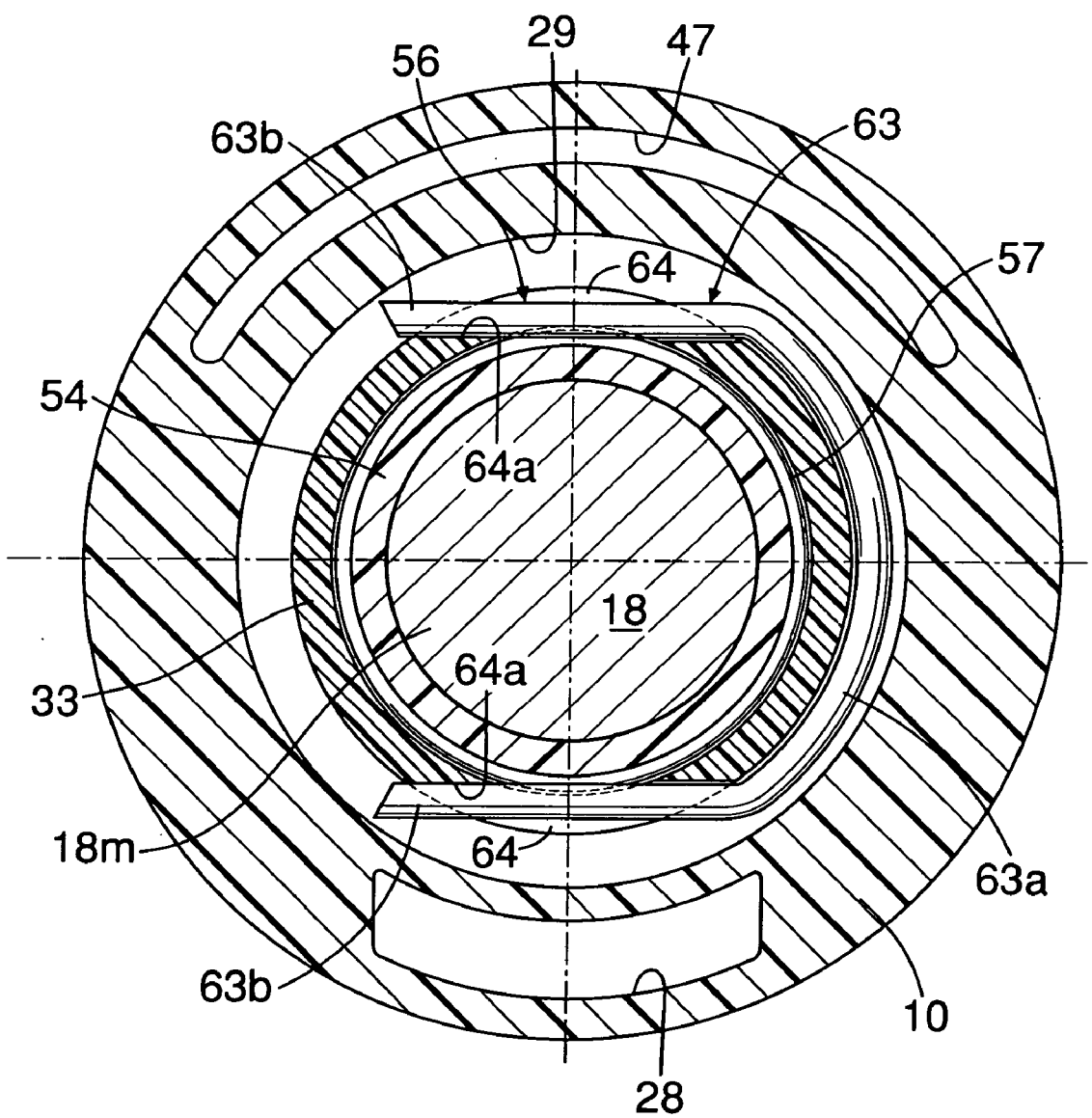
FIG. 10 is a sectional view taken along the line 10—10 in FIG. 9.

As shown in FIG. 10, the locking spring 63 is formed by bending one rod material into a generally u-shape, and includes an arc-shaped portion 63a and a pair of leg portions 63b and 63b which extend along tangential lines of the arc-shaped portion 63a from opposite ends of the arc-shaped portion 63a and oppose to each other. The locking spring 63 has a certain elastic force in a contracting direction to bring both the leg portions 63b and 63b close to each other. A pair of slits 64 and 64 which extend along the tangential lines of the valve piston 33 and reach the interior of the valve piston 33 are provided at opposite side portions of the front end portion of the valve piston 33 in the diameter direction. The locking spring 63 is attached to the valve piston 33 so that both the leg portions 63b and 63b of the locking spring 63 engage with the slits 64 and 64, and the arc-shaped portion 63a conforms to the outer peripheral surface of the valve piston 33, and the locking spring 63 is movable forward and backward together with the valve piston 33. Mutual contraction of both the leg portions 63b and 63b of the locking spring 63 by their elastic forces is restricted by bottom surfaces 64a and 64a of the slits 64 and 64, whereby intermediate portions of the leg portions 63b and 63b which enter the interior of the valve piston 33 through the slits 64 and 64 are held in the non-contact state in which they do not apply pressure to the outer peripheral surface of the support cylinder 54. Both the leg portions 63b and 63b are located at the rear position near the locking protuberance 57 when the valve piston 33 is in the retreat position R. When the valve piston 33 to which the locking spring 63 is attached is inserted into the valve cylinder 10, the inner peripheral surface of the valve cylinder 10 comes close to an outer peripheral surface of the arc-shaped portion 63a of the locking spring 63 to inhibit removal of the locking spring 63 from the valve piston 33. Accordingly, a special removal prevention member for the locking spring 63 is not required.

The locking protuberance 57 is formed to have a sectional shape of an isosceles triangle, a semi-circle, or a shape similar to them. At the time of emergency braking when the input piston 18 moves forward by a predetermined number of strokes or more ahead of the valve cylinder 10, both the leg portions 63b and 63b of the locking spring 63 which moves forward with the input piston 18 get over the locking protuberance 57 and engage with the front surface of the locking protuberance 57 while they are extended outward by the locking protuberance 57 so as to engage the valve piston 33 with the support cylinder 54 against the set load of the set spring 51 in the fully opened state of the atmosphere introduction valve seat 31. Accordingly, the locking spring 63 and the locking protuberance 57 constitute locking means 56 which locks the valve piston 33, which moves forward with the input piston 18, at the valve cylinder 10 and keeps the fully opened state of the atmosphere introduction valve seat 31.

Even in the state in which both the leg portions 63b and 63b are engaged with the front surface of the locking protuberance 57, when a retreating force of a predetermined value or more which is larger than the set load acts on the valve piston 33, both the leg portions 63b and 63 get over the locking protuberance 57 again and return to the rear surface side of the locking protuberance 57.

Since the other parts of constitution are the same as in the first embodiment, the same reference numerals and characters are given to the components corresponding to the first embodiment in FIG. 9 to FIG. 13, and the explanation of them will be omitted.

An operation of the third embodiment will be explained next.

Halt of Vacuum Booster

In the halted state of the vacuum booster B, the key 32 attached to the support cylinder 54 of the valve cylinder 10 abuts to the front surface of the stopper wall 19 of the rear half shell 1b, and the front end surface of the neck portion 18b of the input piston 18 abuts to this key 32, whereby the booster piston 4 and the input rod 20 are located at their respective retreat limits, as shown in FIG. 9. As in the case of the first and second embodiments, the valve piston 33 is held at the retreat position R where the valve piston 33 abuts to the stop ring 50 on the input piston 18 by the biasing force of the set spring 51, and the atmosphere introduction valve seat 31 of the rear end of the valve piston 33 presses the valve 34a to separate the valve portion 34a slightly from the vacuum introduction valve seat 30 while the atmosphere introduction valve seat 31 is sitting on the valve portion 34a of the valve element 34. As a result, the communication between the atmosphere introduction port 39 and the second port 29 is cut off, while the communication between the first and second ports 28 and 29 is established. As a result, since the vacuum pressure of the vacuum chamber 2 is transmitted to the operating chamber 3 through both the ports 28 and 29, and both the chambers 2 and 3 have the same pressure, the booster piston 4 and the valve cylinder 10 are kept at the retreat position by the biasing force of the booster return spring 27.

Normal Braking

When the brake pedal P is depressed at an ordinary speed to brake the vehicle to move the input rod 20 and the input piston 18 forward, the input piston 18 moves forward with the valve piston 33 held at the retreat position R from the beginning, as in the case of the first and second embodiments. Therefore, the valve portion 34a is immediately seated on the vacuum introduction valve seat 30 by the biasing force of the valve spring 36 as the extending and contracting cylinder portion 34c is extended by the biasing force, and at the same time the atmosphere introduction valve seat 31 is separated from the valve element 34, whereby the communication between the first and second ports 28 and 29 is cut off, and the second port 29 is allowed to communicate with the atmosphere introduction port 39 via the inside of the valve element 34.

As a result, the atmosphere, which flows into the valve cylinder 10 from the atmosphere introduction port 39, passes through the atmosphere introduction valve seat 31, then is introduced into the operating chamber 3 via the second port 29, and brings the operating chamber 3 under higher pressure than the vacuum chamber 2. Therefore, the booster piston 4, which obtains the forward propulsive force based on the atmospheric pressure difference between the operating chamber 3 and the vacuum chamber 2, moves forward against the force of the booster return spring 27 while being accompanied by the valve cylinder 10, the operating piston 15, the elastic reaction piston 22, the output piston 21 and the output rod 25. The piston Mb of the brake master cylinder M is pressed forward by the output rod 25, and the thus-generated hydraulic pressure operates the corresponding wheel brakes. Thus, the atmosphere introduction valve seat 31 moves forward at the same time when the input rod 20 moves forward, and separates from the valve portion 34a, whereby responsiveness of the booster piston 4 can be enhanced.

Even when the atmosphere introduction valve seat 31 opens, the input rod 20 does not receive the reaction force from the reaction force mechanism 24 at the early stage of forward movement of the input rod 20 until the input piston front portion 18f reduces the gap g and abuts to the elastic reaction piston 22, and therefore the output of the output rod 25 shows a jumping characteristic of sudden rise as indicated by the line a-b in FIG. 7.

After the input piston front portion 18f abuts to the elastic reaction piston 22, a part of the operating reaction force of the output rod 25 is fed back to the input rod 20 via the elastic reaction piston 22, and therefore the operator can perceive the magnitude of the output of the output rod 25.

Figure 11:
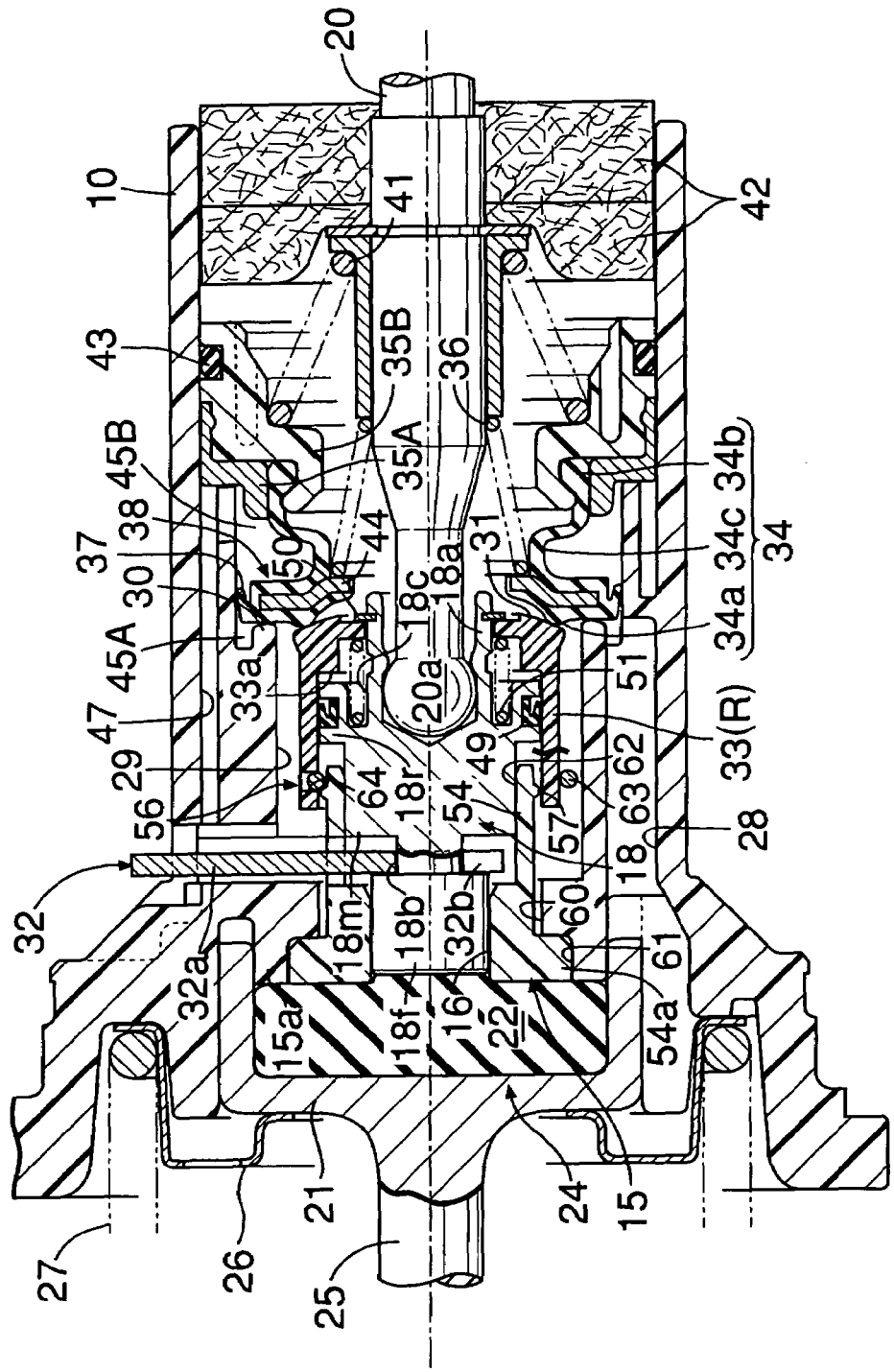
FIG. 11 is an explanatory view of an operation of the vacuum booster at the time of normal braking.

If the forward movement of the input rod 20 is stopped when the desired output is obtained, the forward movement of the booster piston 4 is stopped, by seating the valve portion 34a of the valve element 34 on the atmosphere introduction valve seat 31 and inhibiting the introduction of more atmosphere than this into the vacuum chamber 2 (see FIG. 11). Accordingly, the valve cylinder 10 and the booster piston 4 move forward following the forward movement of the input rod 20.

At the time of normal braking at which the forward moving speed of the input rod 20 is comparatively low, delay in following of the booster piston 4 and the valve cylinder 10 to the input rod 20 is comparatively small. Therefore, relative displacement of the input rod 20 and the valve cylinder 10 is small, and the relative displacement of the valve piston 33 which moves forward with the input piston 18 connected to the input rod 20 and the support cylinder 54 connected to the valve cylinder 10 is small. Accordingly, both the leg portions 63b and 63b of the locking spring 63 which move forward and backward with the valve piston 33 only move slightly on the outer peripheral surface of the support cylinder 54 behind the locking protuberance 57, and do not ride on the locking protuberance 57.

The output of the output rod 25 increases as indicated by the line b-c in FIG. 7 at the servo ratio which is determined by the ratio of the pressure receiving areas of the operating piston 15 and the input piston front portion 18f which abut to the elastic reaction piston 22.

After the atmospheric pressure difference between the vacuum chamber 2 and the operating chamber 3 reaches the servo limit point c at which the atmospheric pressure difference becomes maximum, the output of the output rod 25 becomes the sum of the maximum propulsive force of the booster piston 4 by the atmospheric pressure difference and the operating input force to the input rod 20 as indicated by the line c-d.

Emergency Braking

Figure 12:
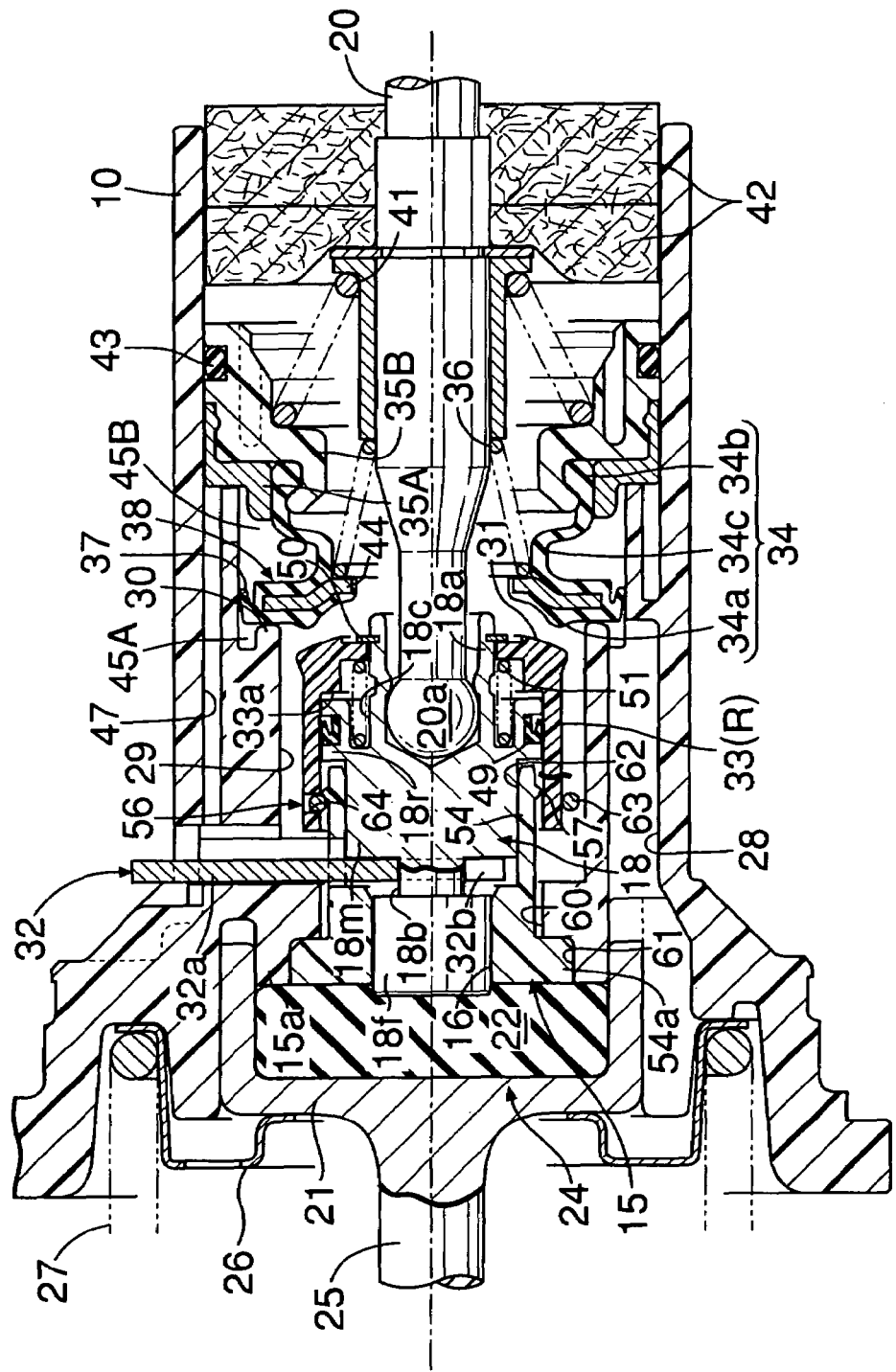
FIG. 12 is an explanatory view of an operation of the vacuum booster at the time of emergency braking.

At the time of emergency braking at which the brake pedal P is abruptly depressed, the forward moving speed of the input piston 18 is high, and therefore before the booster piston 4 and the valve cylinder 10 begin to move forward, the input piston 18 and the valve piston 33 are moved forward greatly while the elastic reaction piston 22 is being compressed by the input piston front portion 18f. Then, as shown in FIG. 12, both the leg portions 63b and 63b of the locking spring 63 of the valve piston 33 ride over the locking protuberance 55 of the support cylinder 54 to the front and engage with the front surface of the locking protuberance 55, the locking spring 63 is in the locked state at the support cylinder 54 connected to the valve cylinder 10 against the biasing force of the set spring 51, and the atmosphere introduction valve seat 31 is held in the fully opened state in which the atmosphere introduction valve seat 31 is separated to the maximum from the valve portion 34*a* of the valve element 34.

When the valve piston 33 is locked at the support cylinder 54 in the fully opened state of the atmosphere introduction valve seat 31, the valve piston 33 moves forward integrally with the valve cylinder 10 even if the booster piston 4 and the valve cylinder 10 slightly move forward following the forward movement of the input rod 20, as in the case of the first and second embodiments, the fully open state of the atmosphere introduction valve seat 31 is kept. As a result, a large quantity of atmosphere is introduced into the vacuum chamber 2 at a time, and the atmospheric pressure difference between the vacuum chamber 2 and the operating chamber 3 immediately reaches the servo limit point cat which the atmospheric pressure difference becomes the maximum, whereby the piston Ma of the master cylinder M continues to be pressed strongly, thus responding to the emergency braking. If the emergency braking is performed in the middle of the normal braking, a servo limit c is immediately achieved for the emergency braking as shown by line f-e'-c in FIG. 7.

Also in the emergency braking, the atmosphere introduction valve seat 31 moves forward at the same time when the input rod 20 moves forward to separate from the valve portion 34*a*, and therefore responsiveness of the booster piston 4 can be enhanced.

Release from Emergency Braking State

When the depressing force is released from the brake pedal P to release the emergency braking state, the input rod 20 and the input piston 18 first retreat with the force of the input return spring 41. When the input piston 18 begins to retreat, the rear end surface of the input piston 18 abuts to the annular shoulder portion 33*a* of the inner periphery of the rear end portion of the valve piston 33, and the input piston 18 returns the valve piston 33 to the rear, as shown in FIG. 13. Therefore, both the leg portions 63*b* and 63*b* of the locking spring 63 rearward ride over the locking protuberance 55 of the support cylinder 54, and release the locking state for the support cylinder 54. Thereafter, as in the case of the first and second embodiments, the valve piston 33 immediately returns to the retreat position R at which the valve piston 33 abuts on the stop ring 50 of the input piston 18 by the biasing force of the set spring 51, seats the atmosphere introduction valve seat 31 on the valve portion 34*a* of the valve element 34, and presses the valve portion 34*a* to the rear and separates the valve portion 34*a* from the vacuum introduction valve seat 30. Therefore, the operating chamber 3 communicates with the vacuum chamber 2 via the second port 29 and the first port 28, and the introduction of the atmosphere into the operating chamber 3 is inhibited, while the air of the operating chamber 3 is taken into the vacuum source V via the vacuum chamber 2, and the atmospheric pressure difference between them is eliminated. Therefore, the booster piston 4 also retreats with the elastic force of the booster return spring 27, and the operation of the master cylinder M is released.

According to the third embodiment, at the time of emergency braking, the locking means 55, which locks the valve piston 33 at the support cylinder 54 in the fully open state of the atmosphere introduction valve seat 31, is constituted by the substantially U-shaped locking spring 63 attached to a pair of slits 64 and 64 at both the side portions of the valve piston 33, and the annular locking protuberance 57 formed on the outer peripheral surface of the support cylinder 54. Contractions to each other by their elastic forces of both the leg portions 63*b* and 63*b* of the locking spring 63 are restrained by the bottom surfaces 64*a* and 64*a* of the slits 64 and 64, and thereby the intermediate portions which enter the interior of the valve piston 33 through the slits 64 and 64 are held in the non-contact state in which the intermediate portions do not apply pressure to the outer peripheral surface of the support cylinder 54. Therefore, as long as both the leg portions 63*b* and 63*b* of the locking spring 63 do not ride on the locking protuberance 57 of the outer peripheral surface of the support cylinder 54, both the leg portions 63*b* and 63*b* do not strongly contact the outer peripheral surface of the support cylinder 54 by friction, and sliding resistance does not occur. Accordingly, manipulation feeling at the time of normal braking at which relative displacement of the valve cylinder 10 and the support cylinder 54 is extremely small can be made favorable.

Since the support cylinder 54 is molded separately from the valve cylinder 10, the support cylinder 54 can be easily molded without any interference of the valve cylinder 10 in spite of the complicated shape including the annular locking protuberance 57 and the mounting flange 54*a* on its outer periphery. The internal shape of the valve cylinder 10 is simplified because the support cylinder 54 is separated, and molding of the valve cylinder 10 is facilitated, thus reducing the size in the axial direction and make the vacuum booster B compact ultimately.

Since the support cylinder 54 is disposed to penetrate through the through-hole 60 provided in the center portion of the valve cylinder 10, the mounting flange 54*a* of the outer periphery of the front end portion of the support cylinder 54 is fitted into the recessed portion 61 formed on the front end surface of the valve cylinder 10 with the annular outer peripheral portion 15*a* of the operating piston 15 being left, the front end portion of the support cylinder 54 and the annular outer peripheral portion 15*a* constitute the operating piston 15 of the reaction force mechanism 24, and the elastic reaction piston 22 is brought into close contact with the front end surfaces of the support cylinder 54 and the annular outer peripheral portion 15*a*. Therefore, the support cylinder 54 can be easily connected to the valve cylinder 10 without using a special fixing member for connecting the support cylinder 54 to the valve cylinder 10, and in addition, the elastic reaction piston 22 exhibits a function as a sealing member for sealing the space between the annular outer peripheral portion 15*a* and the support cylinder 54, and therefore a special sealing member is not required.

The present invention is not limited to the above-described embodiments, and may be variously modified without departing from the subject matter of the invention. For example, in the locking means 56 of the first embodiment and the second embodiment, a radially inward contracting force may be given to the elastic arm portions 52*a* of the locking claws 52, 52 . . . themselves, thereby eliminating the annular spring 53. The U-shaped locking spring 63 in the third embodiment may be replaced by an annular spring which is made of a coil spring and tends to contract in diameter so that when attached to the valve piston 33, the portions of the locking spring 63 entering inside the slits 64 can be made an elastic engaging portion capable of engaging with the locking protuberance 57 of the support cylinder 54.

What is claimed is:

1. A vacuum booster comprising: a booster shell; a booster piston accommodated in the booster shell to divide an interior of the booster shell into a front vacuum chamber connected to a vacuum source and a rear operating chamber; a valve cylinder slidably supported at a rear wall of the booster shell to be connected to the booster piston; an input rod movable forward and backward, an input return spring that biases the input rod in a retreat direction, and a control valve that changes over communication of the operating chamber with one of the vacuum chamber and atmosphere in accordance with forward and backward movement of the input rod, which are placed in the valve cylinder, the control valve being constituted by an atmosphere introduction valve seat that is formed on a valve piston which moves in a manner operatively connected with the forward and backward movement of the input rod, a vacuum introduction valve seat that is connected to the valve cylinder to move in a manner operatively associated with forward and backward movement of the valve cylinder, and a valve element that is biased by a spring in a direction in which it is seated on the atmosphere introduction valve seat and the vacuum introduction valve seat, cuts off communication of the operating chamber with the atmosphere and the vacuum chamber when the valve element sits on both the valve seats, allows the operating chamber to communicate with the atmosphere when the atmosphere introduction valve seat opens following the forward movement of the input rod, and allows the operating chamber to communicate with the vacuum chamber when the vacuum introduction valve seat opens following the retreat of the input rod; and a reaction force mechanism that is interposed between the valve cylinder with the input rod and an output rod that is slidably supported at the booster shell, and that transmits a combined force of a manipulation input to the input rod and a propulsive force of the booster piston by atmospheric pressure difference between the operating chamber and the vacuum chamber to the output rod, wherein a valve piston is fitted onto an input piston of the reaction force mechanism which is connected to the input rod, so that the valve piston is capable of sliding forward from a predetermined retreat position with respect to the input piston, wherein a set spring that biases the valve piston to the retreat position is provided between the input piston and the valve piston, and wherein locking means is provided between the valve piston and the valve cylinder to hold the atmosphere introduction valve seat in an open state by locking the valve piston, which moves forward with the input piston, at the valve cylinder at the time of emergency braking when the input piston moves forward by a predetermined stroke or more ahead of the valve cylinder.

2. A vacuum booster comprising: a booster shell; a booster piston accommodated in the booster shell to divide an interior of the booster shell into a front vacuum chamber connected to a vacuum source and a rear operating chamber; a valve cylinder slidably supported at a rear wall of the booster shell to be connected to the booster piston; an input rod movable forward and backward, an input return spring that biases the input rod in a retreat direction, and a control valve that changes over communication of the operating chamber with one of the vacuum chamber and atmosphere in accordance with forward and backward movement of the input rod, which are placed in the valve cylinder; the control valve being constituted by an atmosphere introduction valve seat that is formed on a valve piston which moves in a manner operatively connected with the forward and backward movement of the input rod, a vacuum introduction valve seat that is connected to the valve cylinder to move in a manner operatively connected with forward and backward movement of the valve cylinder, and a valve element that is biased by a spring in a direction in which it is seated on the atmosphere introduction valve seat and the vacuum introduction valve seat, cuts off communication of the operating chamber with the atmosphere and vacuum chamber when the valve element sits on both the valve seats, allows the operating chamber to communicate with the atmosphere when the atmosphere introduction valve seat opens following the forward movement of the input rod, and allows the operating chamber to communicate with the vacuum chamber when the vacuum introduction valve seat opens following the retreat of the input rod; and a reaction force mechanism that is interposed between the valve cylinder with the input rod and an output rod that is slidably supported at the booster shell, and that transmits a combined force of a manipulation input to the input rod and a propulsive force of the booster piston by atmospheric pressure difference between the operating chamber and the vacuum chamber to the output rod; and the reaction force mechanism being constituted by an input piston connected to the input rod, an operating piston that connects to the booster piston and is placed to enclose the input piston, an output piston connected to the output rod, and an elastic reaction piston that is interposed between a rear end surface of the output piston and front end surfaces of the input piston and the operating piston, wherein a support cylinder that is molded separately from the valve cylinder is attached to the valve cylinder, wherein a valve piston is fitted onto the input piston which is slidably fitted to an inner periphery of the support cylinder, so that the valve piston is capable of sliding forward from a predetermined retreat position with respect to the input piston, wherein a set spring that biases the valve piston to the retreat position is provided between the input piston and the valve piston, and wherein locking means is provided between the support cylinder and the valve piston to hold the atmosphere introduction valve seat in an open state by looking the valve piston, which moves forward with the input piston, at the support cylinder at the time of emergency braking when the input piston moves forward by a predetermined stroke or more ahead of the valve cylinder.

3. The vacuum booster according to claim 2, wherein the valve cylinder includes a through-hole that penetrates trough a center portion of the valve cylinder and a recessed portion that opens to a front surface of the valve cylinder and connects to the through-hole via a step portion, wherein the support cylinder is placed in the through-hole, and a mounting flange formed at a front end of the support cylinder is fitted into the recessed portion, wherein the operating piston of the reaction force mechanism is constituted by a front end portion of the support cylinder having the mounting flange and an annular portion formed at the valve cylinder to enclose the recessed portion, and wherein a fitting portion of the annular portion and the support cylinder is sealed by the elastic reaction piston that is in close contact with the front end surface of the operating piston.

4. The vacuum booster according to any one of claims 1 to 3, wherein the locking means is constituted by a locking protuberance that is formed on an outer periphery of the support cylinder connected to the valve cylinder, and elastic locking claws which are formed on the valve piston and elastically engage with the locking protuberance at the time of emergency braking.

5. The vacuum booster according to any one of claims 1 to 3, wherein the locking means is constituted by a locking protuberance that is formed on an outer periphery of the support cylinder connected to the valve cylinder, and a locking spring attached to the support cylinder, wherein the locking spring has an elastic engaging portion that contracts in a radial direction of the support cylinder, wherein the elastic engaging portion is located behind the locking protuberance to face an inside of the valve piston through a slit formed at a side wall of the support cylinder so as not to contact an outer peripheral surface of the support cylinder, and wherein at the time of the emergency braking, the elastic engaging portion rides over the locking protuberance and engages with a front surface of the locking protuberance.

6. The vacuum booster according to claim 5, wherein the locking spring has a pair of leg portions having an elastic force to contract to contact each other, both the leg portions being located behind the locking protuberance to face an inside of the valve piston through slits that are formed at opposite side portions of the support cylinder so as not to contact an outer peripheral surface of the support cylinder, and wherein at the time of the emergency braking, both the leg portions ride over the locking protuberance and engage with a front surface of the locking protuberance.

7. The vacuum booster according to claim 1 or 2, wherein the locking means is constituted so that engagement between the valve piston and the support cylinder by the locking means is released by a retreat force by an input return spring of the input rod.

* * * * *

UNITED STATES PATENT AND TRADEMARK OFFICE
CERTIFICATE OF CORRECTION

PATENT NO. : 7,021,724 B2
APPLICATION NO. : 10/878977
DATED : April 4, 2006
INVENTOR(S) : Shinohara et al.

It is certified that error appears in the above-identified patent and that said Letters Patent is hereby corrected as shown below:

Title Page:
  Under "(56) References Cited", further under "U.S. PATENT DOCUMENTS", change "6,516,704 B1" to --6,516,704 B2--; change "6,564,692 B1" to --6,564,692 B2--.

Column 1:
  Line 20, change "which are rod are placed" to --which are placed--.
  Line 62, change "valves are opened large" to --valves are opened wide--.

Column 2:
  Line 33, change "and therefore the atmosphere" to --and, therefore, the atmosphere--.
  Line 45, change "and therefore the effect of" to --and, therefore, the effect of--.
  Lines 50-51, change "and therefore when the" to --and, therefore, when the--.

Column 3:
  Line 64, change "cylinder, and therefore the" to --cylinder, and, therefore, the--.

Column 4:
  Line 11, change "and therefore there is" to --and, therefore, there is--.
  Line 60, change "piston is fined" to --piston is fitted--.
  Line 61, change "is slidably fined" to --is slidably fitted--.

Column 5:
  Line 15, change "and therefore" to --and, therefore,--.
  Line 24, change "and there-" to --and, there- --.
  Line 25, change "fore the" to --fore, the--.
  Line 29, change "and therefore there is" to --and, therefore, there is--.
  Line 33, change "and therefore" to --and, therefore,--.

Column 6:
  Line 4, change "which connect" to --which connects--.
  Line 5, change "and in addition the elastic" to --and, in addition, the elastic--.
  Line 39, change "portion do not" to --portion does not--.

Column 7:
  Line 13, change "below along the" to --below in conjunction with the--.

Column 11:
  Line 13, change "the operating piton 15" to --the operating piston 15--.

UNITED STATES PATENT AND TRADEMARK OFFICE
CERTIFICATE OF CORRECTION

PATENT NO. : 7,021,724 B2
APPLICATION NO. : 10/878977
DATED : April 4, 2006
INVENTOR(S) : Shinohara et al.

It is certified that error appears in the above-identified patent and that said Letters Patent is hereby corrected as shown below:

Column 12:
   Line 61, change "and therefore the operator" to --and, therefore, the operator--.

Column 13:
   Line 32, change "and therefore, before" to --and, therefore, before--.
   Line 55, change "and therefore the fully" to --and, therefore, the fully--.

Column 14:
   Line 3, change "and therefore the vacuum" to --and, therefore, the vacuum--.
   Line 8, change "and therefore responsiveness" to --and, therefore, responsiveness--.
   Lines 19-20, change "Therefore the locking claws" to --Therefore, the locking claws--.

Column 16:
   Line 2, change "a generally u-shape" to --a generally U-shape--.
   Line 60, change "leg portions 63*b* and 63" to --leg portions 63*b* and 63*b*--.

Column 17:
   Line 16, change "valve 34*a* to separate the valve portion 34*a*" to --valve portion 34*a* to separate the valve portion 34*a*--.

Column 18:
   Line 4, change "and therefore the output" to --and, therefore, the output--.
   Line 11, change "and therefore the operator" to --and, therefore, the operator--.
   Line 55, change "and therefore before the" to --and, therefore, before the--.

Column 19:
   Line 15, change "limit point cat which" to --limit point *c* at which--.
   Line 26, change "and therefore responsiveness" to --and, therefore, responsiveness--.

Column 20:
   Line 42, change "cylinder 10, and in addition," to --cylinder 10, and, in addition,--.
   Lines 45-46, change "cylinder 54, and therefore a special" to --cylinder 54, and, therefore, a special--.

Column 21:
   Line 6, change "the valve cylinder, the control" to --the valve cylinder; the control--.

UNITED STATES PATENT AND TRADEMARK OFFICE
CERTIFICATE OF CORRECTION

PATENT NO. : 7,021,724 B2
APPLICATION NO. : 10/878977
DATED : April 4, 2006
INVENTOR(S) : Shinohara et al.

It is certified that error appears in the above-identified patent and that said Letters Patent is hereby corrected as shown below:

Column 22:
Line 44, change "that penetrates trough" to --that penetrates through--.

Signed and Sealed this

Twenty-third Day of January, 2007

JON W. DUDAS
*Director of the United States Patent and Trademark Office*